(12) United States Patent
Yamamoto et al.

(10) Patent No.: US 7,446,947 B2
(45) Date of Patent: Nov. 4, 2008

(54) VARIABLE MAGNIFICATION OPTICAL SYSTEM AND IMAGE TAKING APPARATUS PROVIDED THEREWITH

(75) Inventors: Yasushi Yamamoto, Kishiwada (JP); Hiroyuki Matsumoto, Wakayama (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 78 days.

(21) Appl. No.: 11/497,115

(22) Filed: Aug. 1, 2006

(65) Prior Publication Data

US 2007/0030577 A1   Feb. 8, 2007

(30) Foreign Application Priority Data

Aug. 2, 2005   (JP)   ............................ 2005-224257

(51) Int. Cl.
   *G02B 15/14*   (2006.01)
(52) U.S. Cl. .................. 359/678; 359/676; 359/687
(58) Field of Classification Search ............... 359/678, 359/676, 686–692
   See application file for complete search history.

(56) References Cited

U.S. PATENT DOCUMENTS

| 7,154,680 | B2* | 12/2006 | Satori et al. ............... 359/687 |
| 7,227,698 | B2* | 6/2007 | Yamamoto et al. .......... 359/687 |
| 2006/0067662 | A1* | 3/2006 | Satori ........................ 396/72 |
| 2006/0262420 | A1* | 11/2006 | Matsumoto et al. ......... 359/676 |
| 2006/0262421 | A1* | 11/2006 | Matsumoto et al. ......... 359/676 |

FOREIGN PATENT DOCUMENTS

| JP | 8-248318 A | 9/1996 |
| JP | 10-20191 A | 1/1998 |
| JP | 2003-202500 A | 7/2003 |
| JP | 2003-302576 A | 10/2003 |
| JP | 2004-4533 A | 1/2004 |
| JP | 2004-69808 A | 3/2004 |
| JP | 2004-102090 A | 4/2004 |
| JP | 2004-170707 A | 6/2004 |

* cited by examiner

*Primary Examiner*—Darryl J Collins
(74) *Attorney, Agent, or Firm*—Sidley Austin LLP

(57) ABSTRACT

A variable magnification optical system includes lens units that focus a ray of light from an object side on an image sensor, in which the lens unit located at a first position from the object side toward the image side includes an optical path changing element for changing an optical path. The variable magnification optical system performs magnification variation by changing gaps between the lens units, and satisfies predetermined conditional formulae.

5 Claims, 16 Drawing Sheets

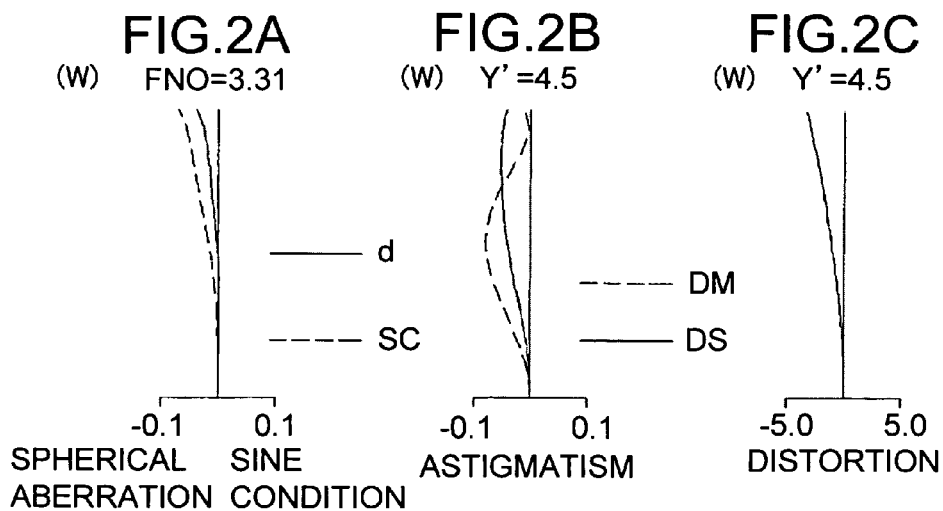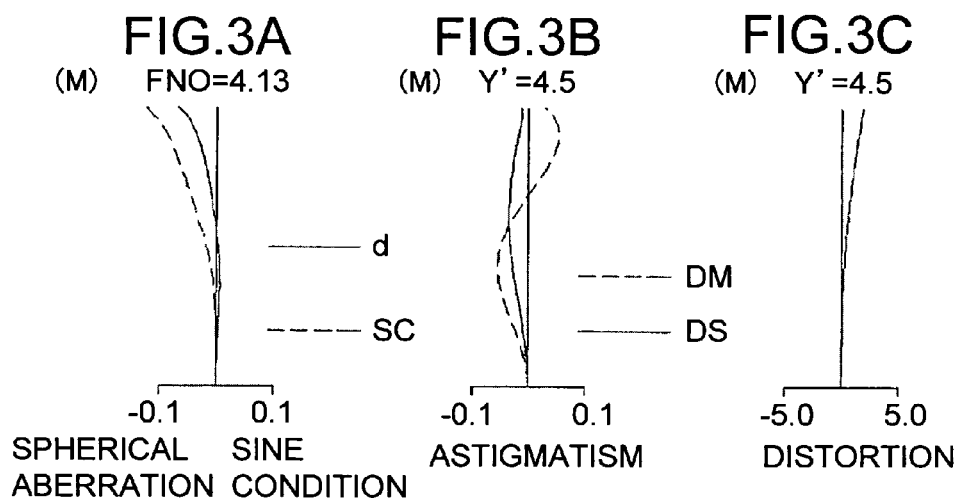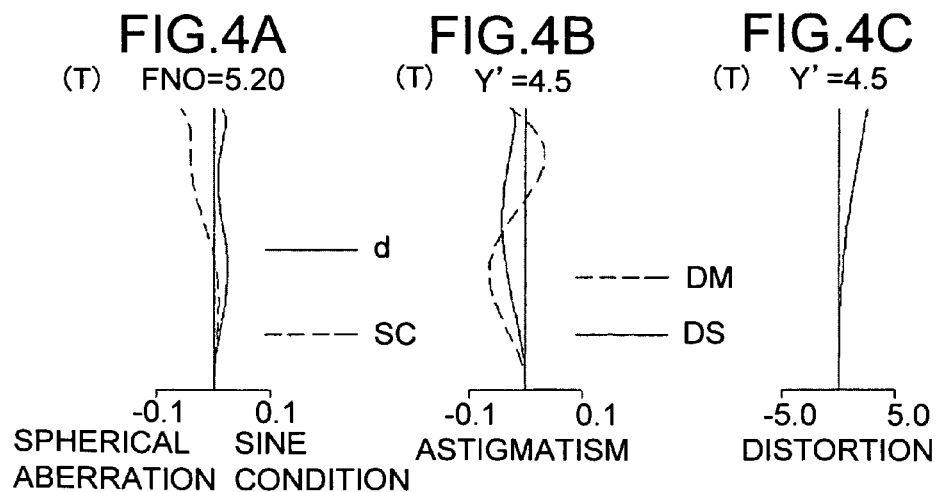

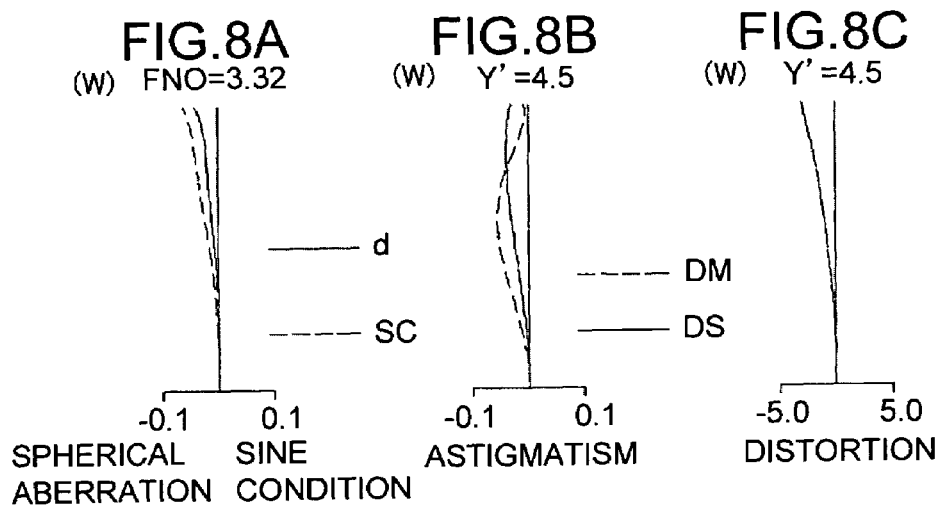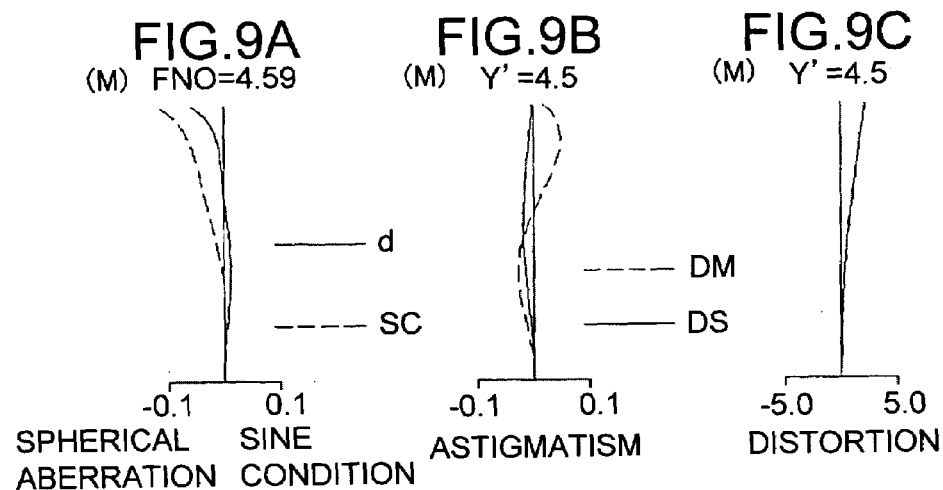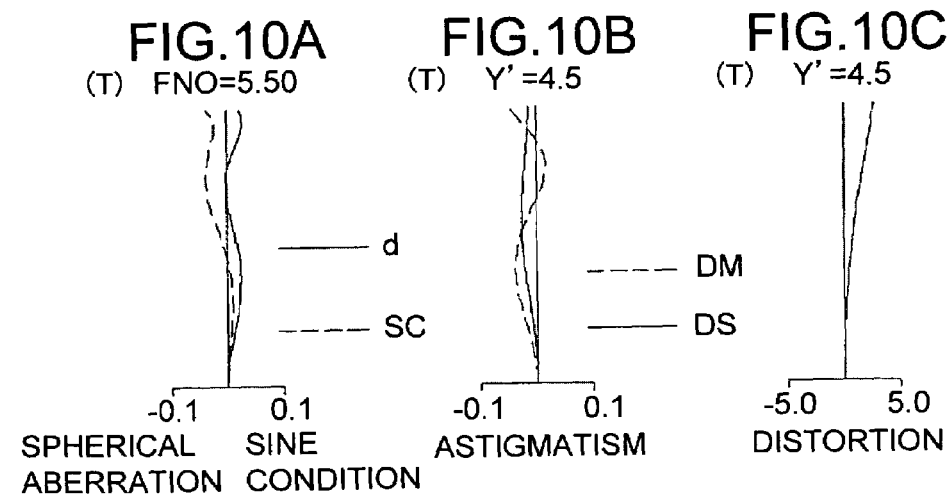

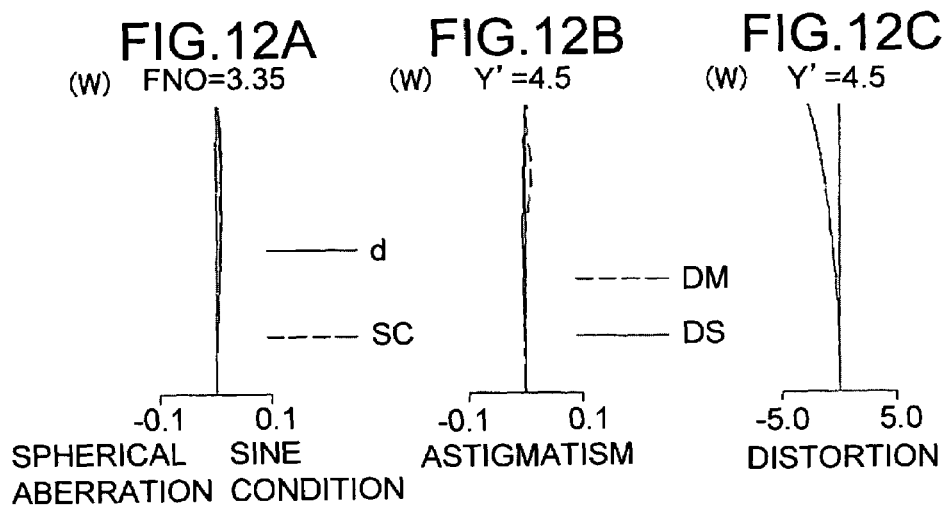
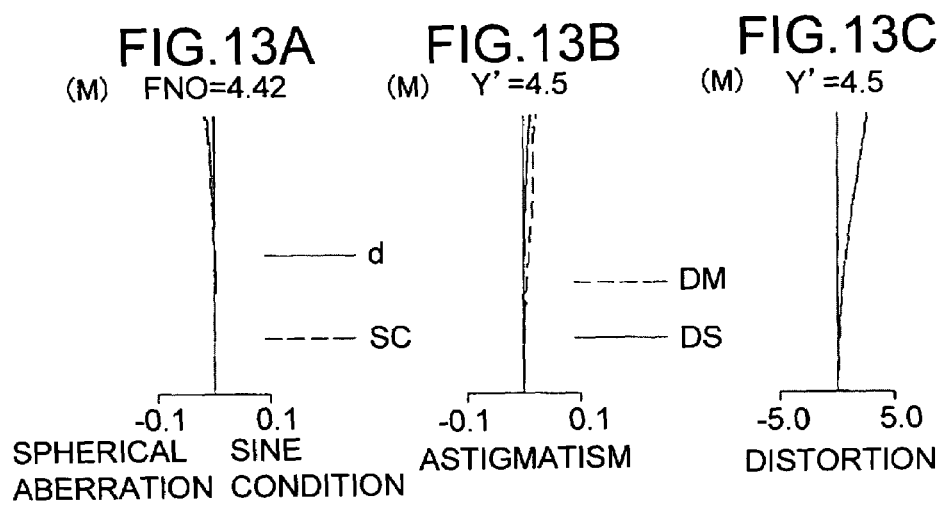
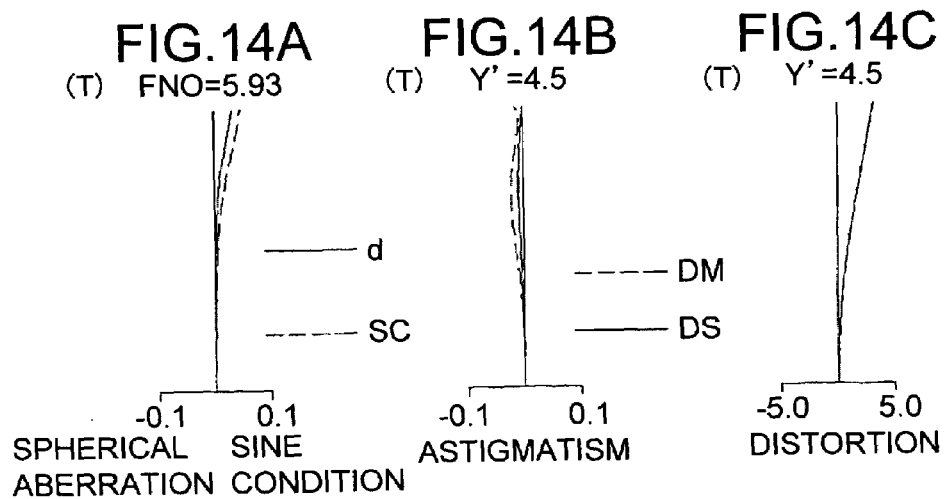

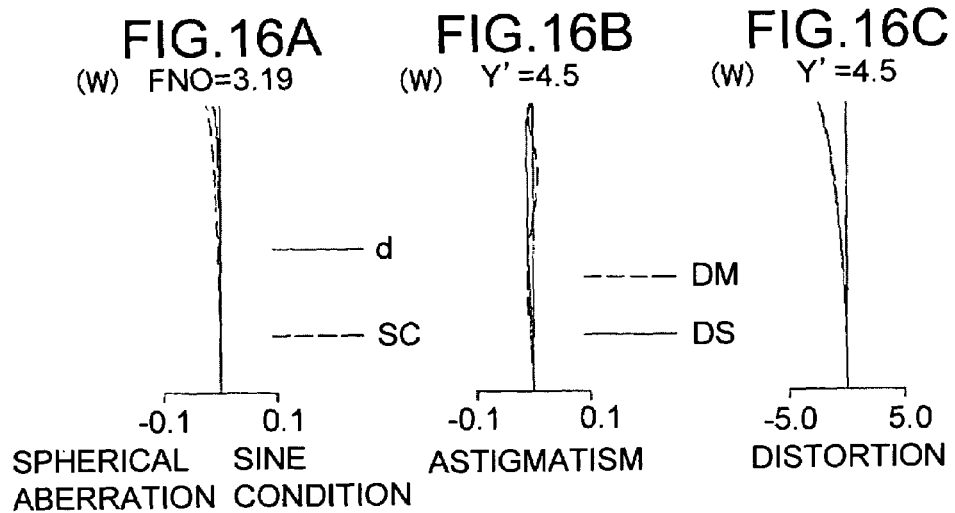
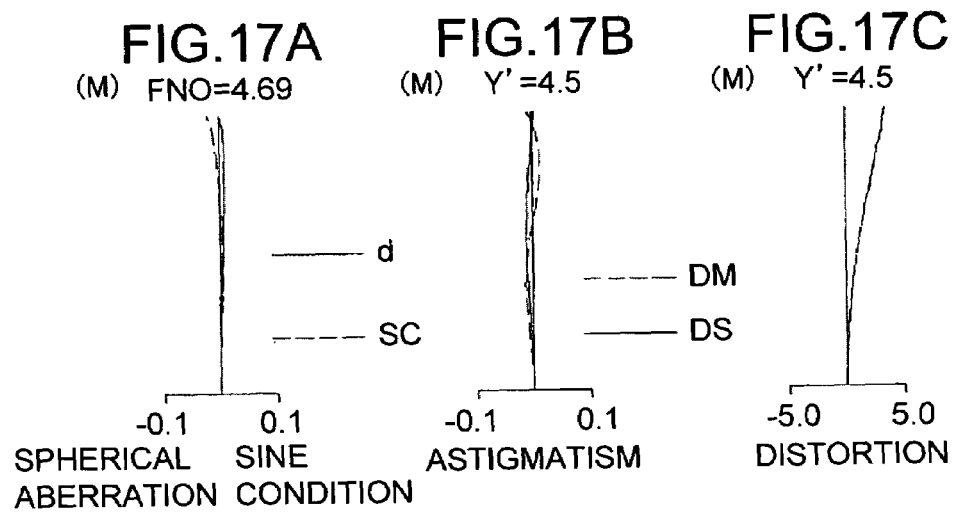
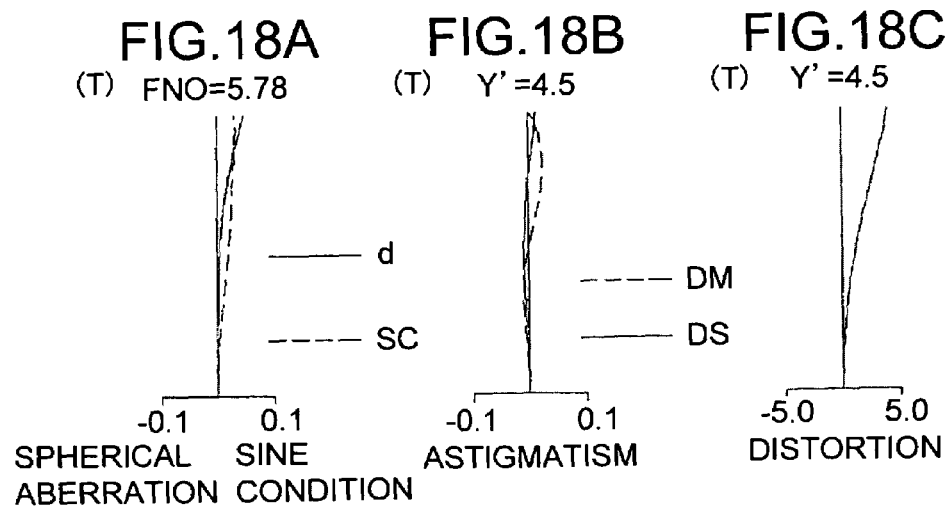

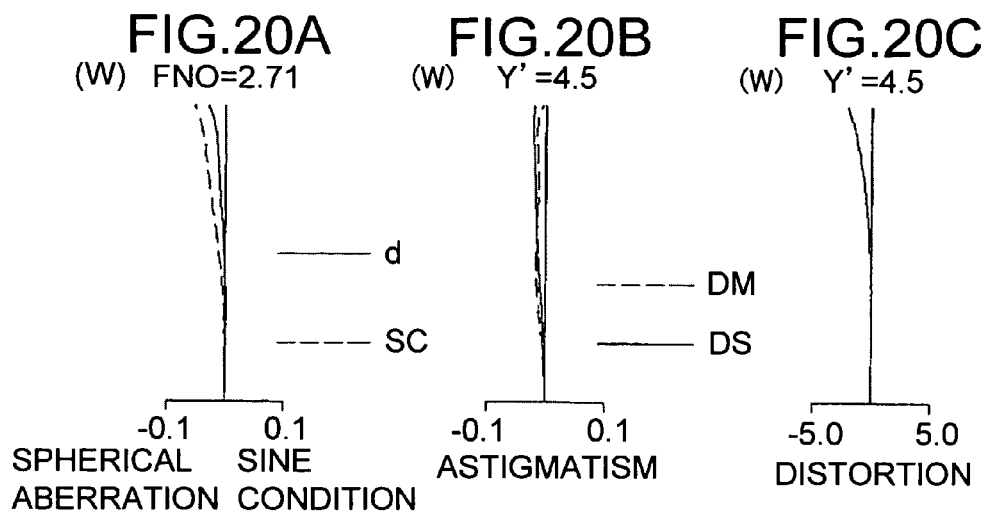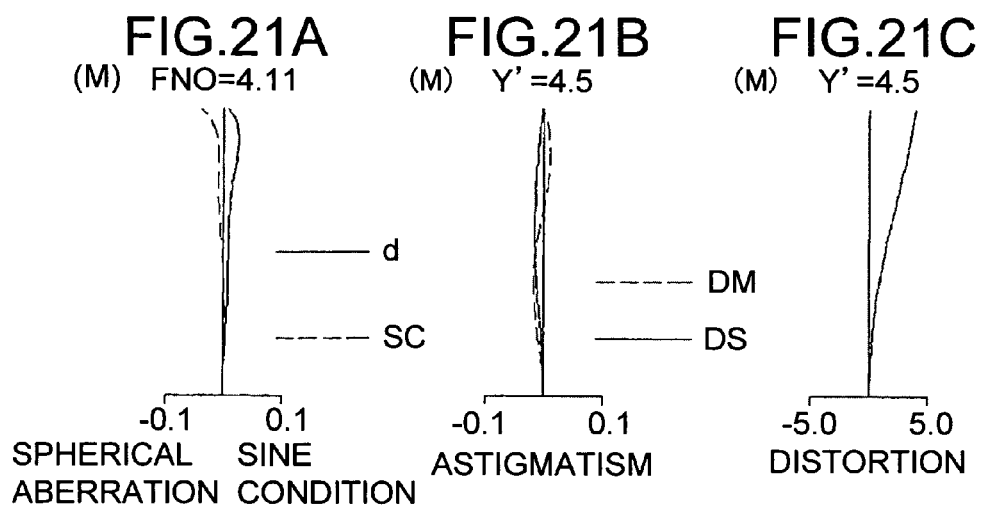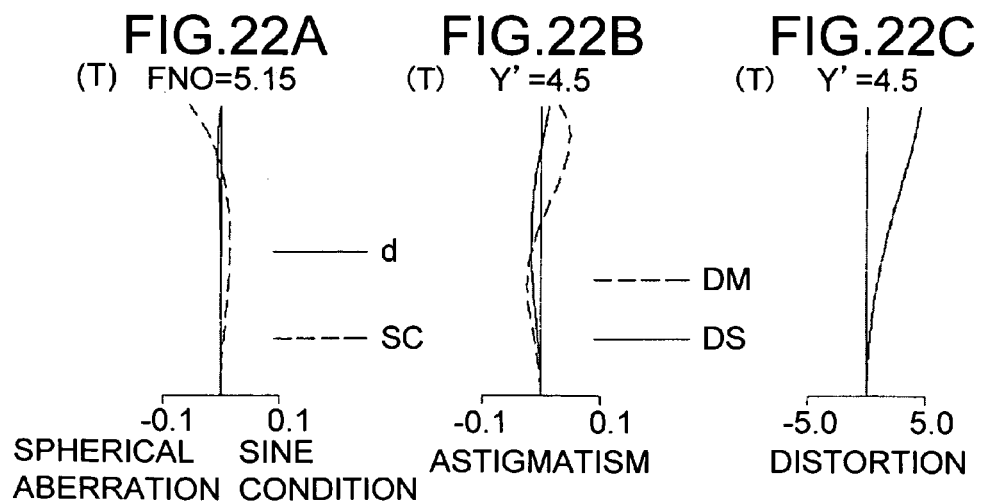

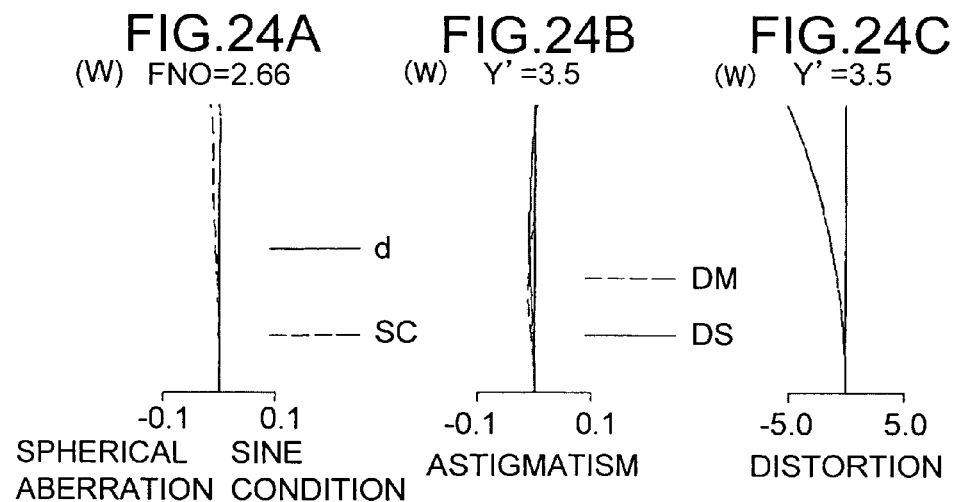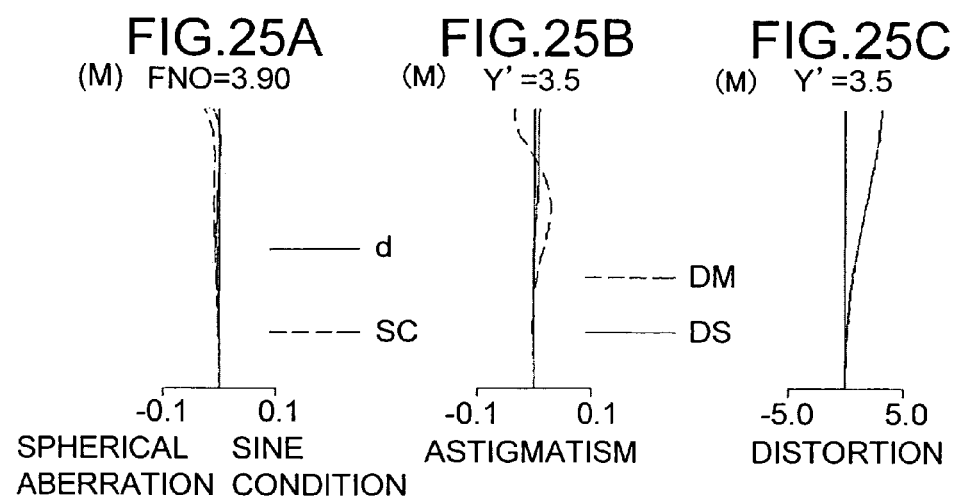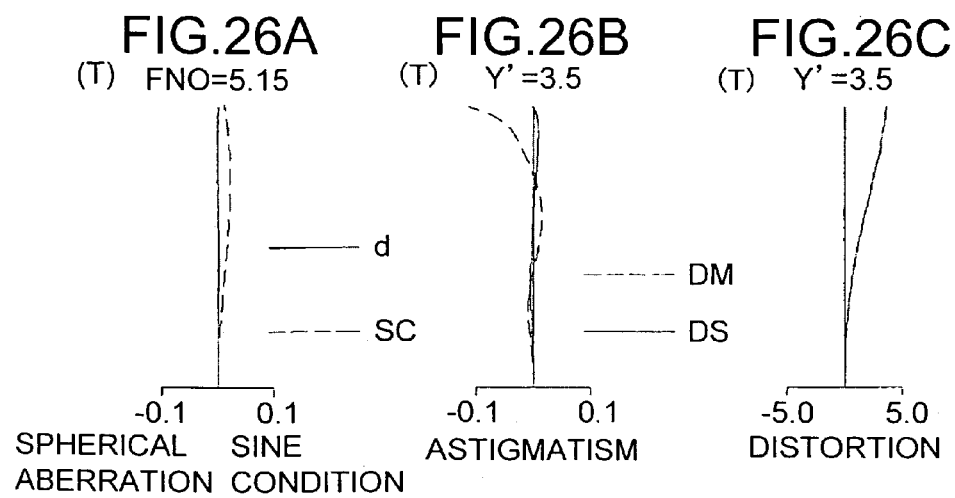

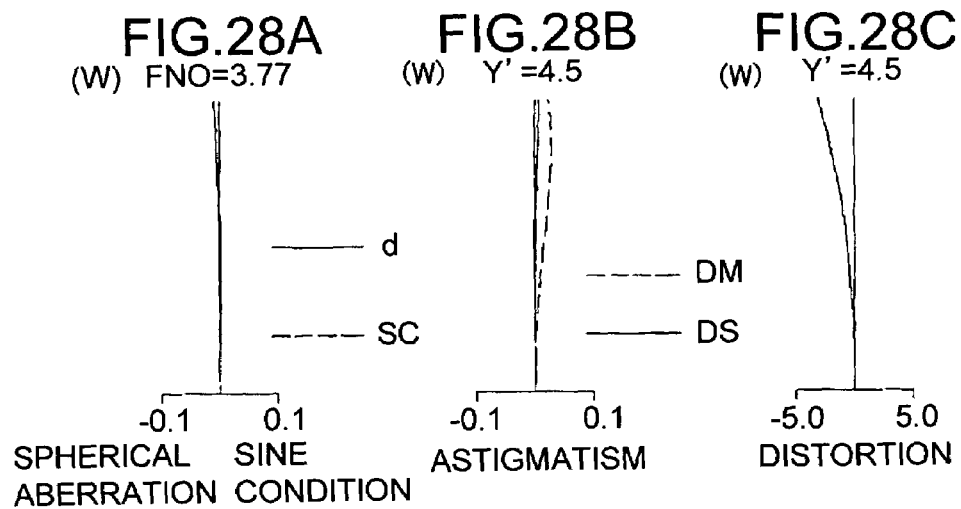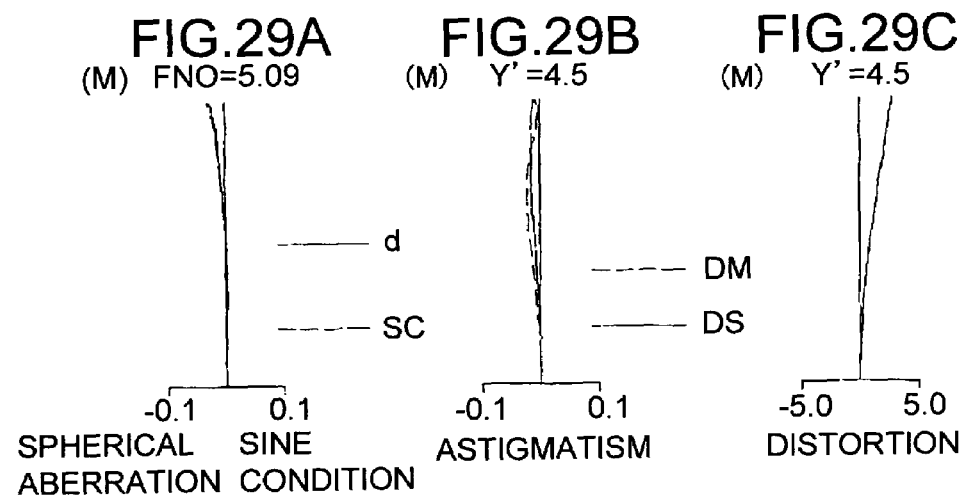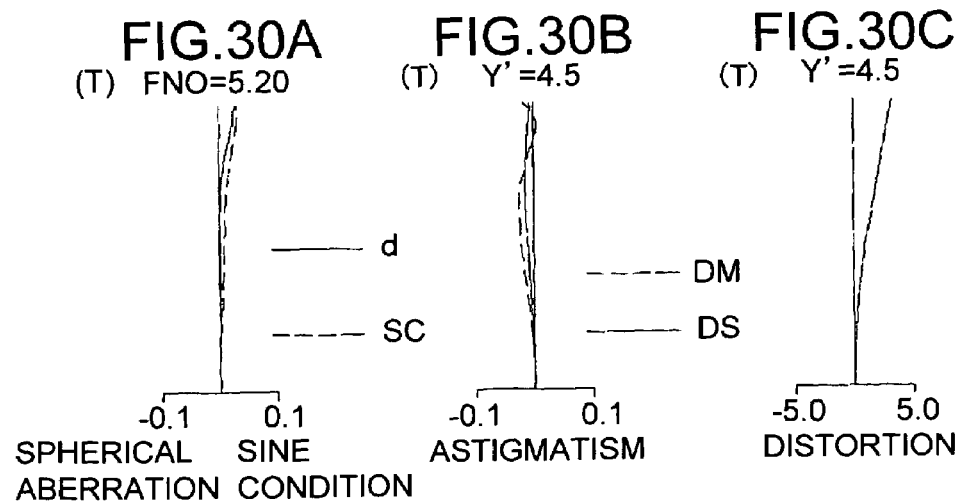

VARIABLE MAGNIFICATION OPTICAL SYSTEM AND IMAGE TAKING APPARATUS PROVIDED THEREWITH

This application is based on JP-A-2005-224257 filed on Aug. 2, 2005, the contents of which are hereby incorporated by reference.

BACKGROUND OF THE INVENTION

1. Field of the Invention

The present invention relates to a variable magnification optical system for use in an optical unit or the like, and to an image taking apparatus provided with this variable magnification optical system.

2. Description of the Prior Art

In recent years, following the widespread use of personal computers (PCs), digital cameras (image taking apparatuses) capable of easily taking in an image have been widespread. Thus, as is the case with cameras using a silver halide film (silver halide film cameras), there has been a demand imposed on such digital cameras for downsizing (slimming-down) and performance enhancement (for example, high magnification variation function and high aberration correction function).

For example, image taking apparatuses disclosed in patent publications 1 and 2 employ an optical prism capable of bending the optical path to satisfy the demand for downsizing. However, these image taking apparatuses assume a zoom ratio (magnification variation ratio) of approximately 3×. Therefore, to satisfy the demand for performance enhancement, it is preferable that the image taking apparatus provide a higher magnification ratio.

On the other hand, an image taking apparatus disclosed in patent publication 3 has lens units with optical power arrangement of positive, negative, positive, and positive, and includes, in the lens unit located at the first position from the object side toward the image side, an optical prism having a positive optical power. This image taking apparatus, as is the case with the image taking apparatuses in patent publications 1 and 2, achieves downsizing through the use of the optical prism. Moreover, this image taking apparatus assumes a zoom ratio of approximately 5×, and thus is a compact, high-performance image taking apparatus.

[Patent publication 1] JP-A-2003-202500
Disclosure date: Jul. 18, 2003
[Patent publication 2] JP-A-2003-302576
Disclosure date: Oct. 24, 2003
[Patent publication 3] JP-A-2004-170707
Disclosure date: Jun. 17, 2004

However, for the image taking apparatus of this patent publication 3, the optical prism is formed of a relatively high-dispersion material. Thus, in a case where the optical prism is decentered when built into an optical system (variable magnification optical system) inside the image taking apparatus (for example, when a surface of the optical prism is inclined from a desired position), there is a risk that a relatively large scale of chromatic aberration, attributable to the decentering, occurs so as to achieve a high zoom ratio.

SUMMARY OF THE INVENTION

In order to solve the problem described above, the present invention has been made, and it is an object of the invention to provide a high-performance variable magnification optical system or the like, which while being compact, can suppress (correct) chromatic aberration and the like.

To achieve the object described above, a variable magnification optical system according to one aspect of the invention includes lens units that focus a ray of light from an object side on an image sensor, in which the lens unit located at a first position from the object side toward the image side includes an optical path changing element for changing a optical path, and the variable magnification optical system performs magnification variation by changing gaps between the lens units. Further, the variable magnification optical system satisfies conditional formulae (1) to (3) below:

| $4 < ft/fw$ | Conditional formula (1), |
| $1.72 < n\_PR$ | Conditional formula (2), |
| $35 < v\_PR$ | Conditional formula (3), | where

| ft | denotes a focal length of the entire system at a telephoto end, |
| fw | denotes a focal length of the entire system at a wide-angle end, |
| n\_PR | denotes a refractive index of the optical path changing element for a d-line, and |
| v\_PR | denotes an Abbe number of the optical path changing element for the d-line. |

Another aspect of the invention relates to an image taking apparatus including lens units that focus a ray of light from an object side on an image sensor, in which the lens unit located at a first position from the object side toward the image side includes an optical path changing element for changing a optical path; performing magnification variation by changing gaps between the lens units; and satisfying the conditional formulae (1) to (3) described above.

The object described above and other objects and features of the invention will be more clarified by the following description on preferred embodiments and also with reference to the accompanying drawings.

BRIEF DESCRIPTION OF THE DRAWINGS

FIG. 2A is a spherical aberration diagram of the variable magnification optical system (Example 1) at the wide-angle end (W);

FIG. 2B is an astigmatism diagram of the variable magnification optical system (Example 1) at the wide-angle end (W);

FIG. 2C is a distortion diagram of the variable magnification optical system (Example 1) at the wide-angle end (W);

FIG. 3A is a spherical aberration diagram of the variable magnification optical system (Example 1) at the middle focal length position (M);

FIG. 3B is an astigmatism diagram of the variable magnification optical system (Example 1) at the middle focal length position (M);

FIG. 3C is a distortion diagram of the variable magnification optical system (Example 1) at the middle focal length position (M);

FIG. 4A is a spherical aberration diagram of the variable magnification optical system (Example 1) at the telephoto end (T);

FIG. 4B is an astigmatism diagram of the variable magnification optical system (Example 1) at the telephoto end (T);

FIG. 4C is a distortion diagram of the variable magnification optical system (Example 1) at the telephoto end (T);

FIG. 8A is a spherical aberration diagram of the variable magnification optical system (Example 2) at the wide-angle end (W);

FIG. 8B is an astigmatism diagram of the variable magnification optical system (Example 2) at the wide-angle end (W);

FIG. 8C is a distortion diagram of the variable magnification optical system (Example 2) at the wide-angle end (W);

FIG. 9A is a spherical aberration diagram of the variable magnification optical system (Example 2) at the middle focal length position (M);

FIG. 9B is an astigmatism diagram of the variable magnification optical system (Example 2) at the middle focal length position (M);

FIG. 9C is a distortion diagram of the variable magnification optical system (Example 2) at the middle focal length position (M);

FIG. 10A is a spherical aberration diagram of a variable magnification optical system (Example 2) at the telephoto end (T);

FIG. 10B is an astigmatism diagram of the variable magnification optical system (Example 2) at the telephoto end (T);

FIG. 10C is a distortion diagram of the variable magnification optical system (Example 2) at the telephoto end (T);

FIG. 12A is a spherical aberration diagram of the variable magnification optical system (Example 3) at the wide-angle end (W);

FIG. 12B is an astigmatism diagram of the variable magnification optical system (Example 3) at the wide-angle end (W);

FIG. 12C is a distortion diagram of the variable magnification optical system (Example 3) at the wide-angle end (W);

FIG. 13A is a spherical aberration diagram of the variable magnification optical system (Example 3) at the middle focal length position (M);

FIG. 13B is an astigmatism diagram of the variable magnification optical system (Example 3) at the middle focal length position (M);

FIG. 13C is a distortion diagram of the variable magnification optical system (Example 3) at the middle focal length position (M);

FIG. 14A is a spherical aberration diagram of a variable magnification optical system (Example 3) at the telephoto end (T);

FIG. 14B is an astigmatism diagram of the variable magnification optical system (Example 3) at the telephoto end (T);

FIG. 14C is a distortion diagram of the variable magnification optical system (Example 3) at the telephoto end (T);

FIG. 16A is a spherical aberration diagram of the variable magnification optical system (Example 4) at the wide-angle end (W);

FIG. 16B is an astigmatism diagram of the variable magnification optical system (Example 4) at the wide-angle end (W);

FIG. 16C is a distortion diagram of the variable magnification optical system (Example 4) at the wide-angle end (W);

FIG. 17A is a spherical aberration diagram of the variable magnification optical system (Example 4) at the middle focal length position (M);

FIG. 17B is an astigmatism diagram of the variable magnification optical system (Example 4) at the middle focal length position (M);

FIG. 17C is a distortion diagram of the variable magnification optical system (Example 4) at the middle focal length position (M);

FIG. 18A is a spherical aberration diagram of the variable magnification optical system (Example 4) at the telephoto end (T);

FIG. 18B is an astigmatism diagram of the variable magnification optical system (Example 4) at the telephoto end (T);

FIG. 18C is a distortion diagram of the variable magnification optical system (Example 4) at the telephoto end (T);

FIG. 20A is a spherical aberration diagram of a variable magnification optical system (Example 5) at the wide-angle end (W);

FIG. 20B is an astigmatism diagram of the variable magnification optical system (Example 5) at the wide-angle end (W);

FIG. 20C is a distortion diagram of the variable magnification optical system (Example 5) at the wide-angle end (W);

FIG. 21A is a spherical aberration diagram of the variable magnification optical system (Example 5) at the middle focal length position (M);

FIG. 21B is an astigmatism diagram of the variable magnification optical system (Example 5) at the middle focal length position (M);

FIG. 21C is a distortion diagram of the variable magnification optical system (Example 5) at the middle focal length position (M);

FIG. 22A is a spherical aberration diagram of the variable magnification optical system (Example 5) at the telephoto end (T);

FIG. 22B is an astigmatism diagram of the variable magnification optical system (Example 5) at the telephoto end (T);

FIG. 22C is a distortion diagram of the variable magnification optical system (Example 5) at the telephoto end (T);

FIG. 24A is a spherical aberration diagram of the variable magnification optical system (Example 6) at the wide-angle end (W);

FIG. 24B is an astigmatism diagram of the variable magnification optical system (Example 6) at the wide-angle end (W);

FIG. 24C is a distortion diagram of the variable magnification optical system (Example 6) at the wide-angle end (W);

FIG. 25A is a spherical aberration diagram of the variable magnification optical system (Example 6) at the middle focal length position (M);

FIG. 25B is an astigmatism diagram of the variable magnification optical system (Example 6) at the middle focal length position (M);

FIG. 25C is a distortion diagram of the variable magnification optical system (Example 6) at the middle focal length position (M);

FIG. 26A is a spherical aberration diagram of the variable magnification optical system (Example 6) at the telephoto end (T);

FIG. 26B is an astigmatism diagram of the variable magnification optical system (Example 6) at the telephoto end (T);

FIG. 26C is a distortion diagram of the variable magnification optical system (Example 6) at the telephoto end (T);

FIG. 28A is a spherical aberration diagram of the variable magnification optical system (Example 7) at the wide-angle end (W);

FIG. 28B is an astigmatism diagram of the variable magnification optical system (Example 7) at the wide-angle end (W);

FIG. 28C is a distortion diagram of the variable magnification optical system (Example 7) at the wide-angle end (W);

FIG. 29A is a spherical aberration diagram of the variable magnification optical system (Example 7) at the middle focal length position (M);

FIG. 29B is an astigmatism diagram of the variable magnification optical system (Example 7) at the middle focal length position (M);

FIG. 29C is a distortion diagram of the variable magnification optical system (Example 7) at the middle focal length position (M);

FIG. 30A is a spherical aberration diagram of the variable magnification optical system (Example 7) at the telephoto end (T);

FIG. 30B is an astigmatism diagram of the variable magnification optical system (Example 7) at the telephoto end (T); and FIG. 30C is a distortion diagram of the variable magnification optical system (Example 7) at the telephoto end (T).

DETAILED DESCRIPTION OF THE PREFERRED EMBODIMENTS

First Embodiment

The embodiment of the present invention will be described with reference to the accompanying drawings.

[1. Digital Camera]

Figure 5:
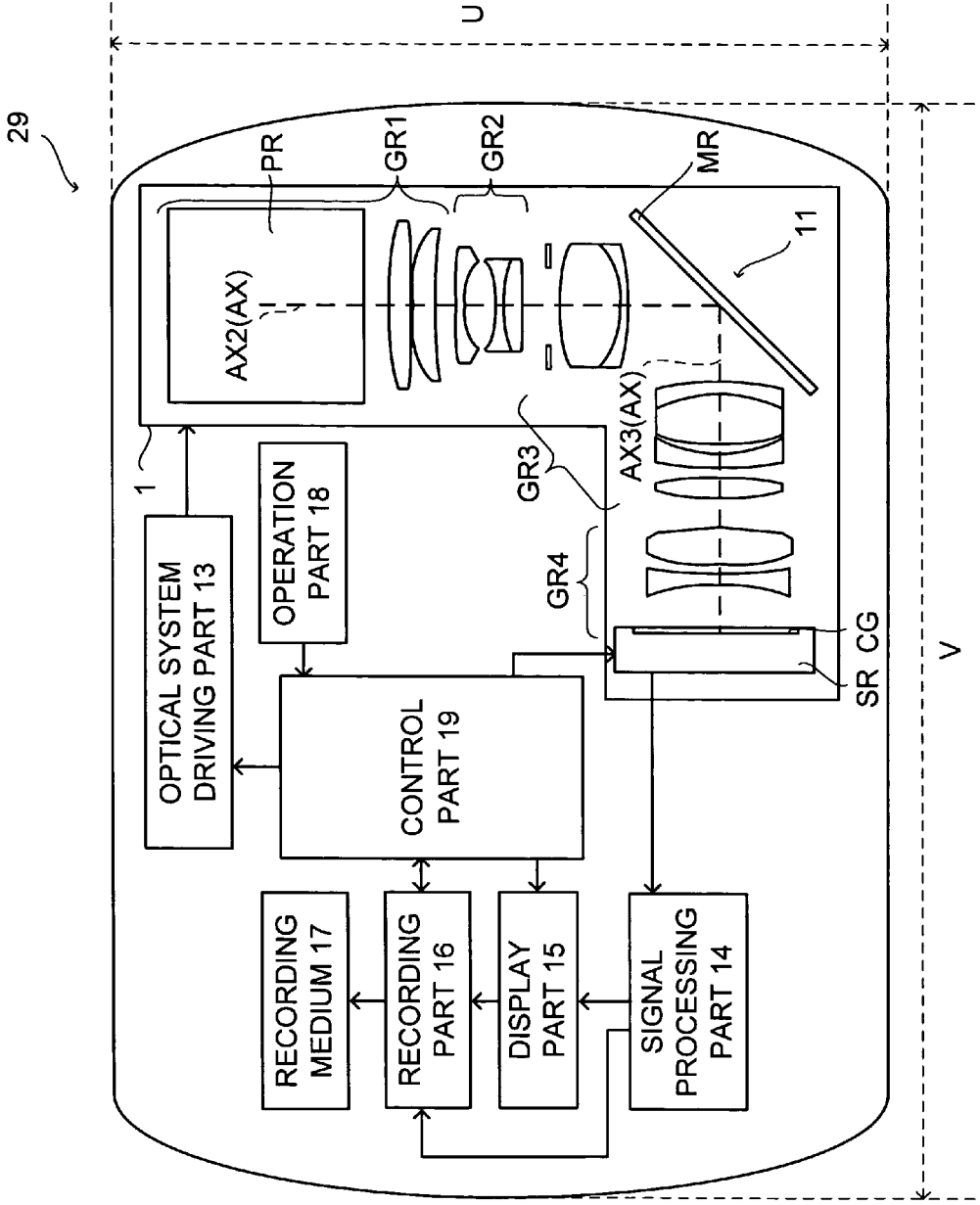
FIG. 5 is a schematic block diagram of a digital camera of each embodiment as viewed from behind.
Figure 6:
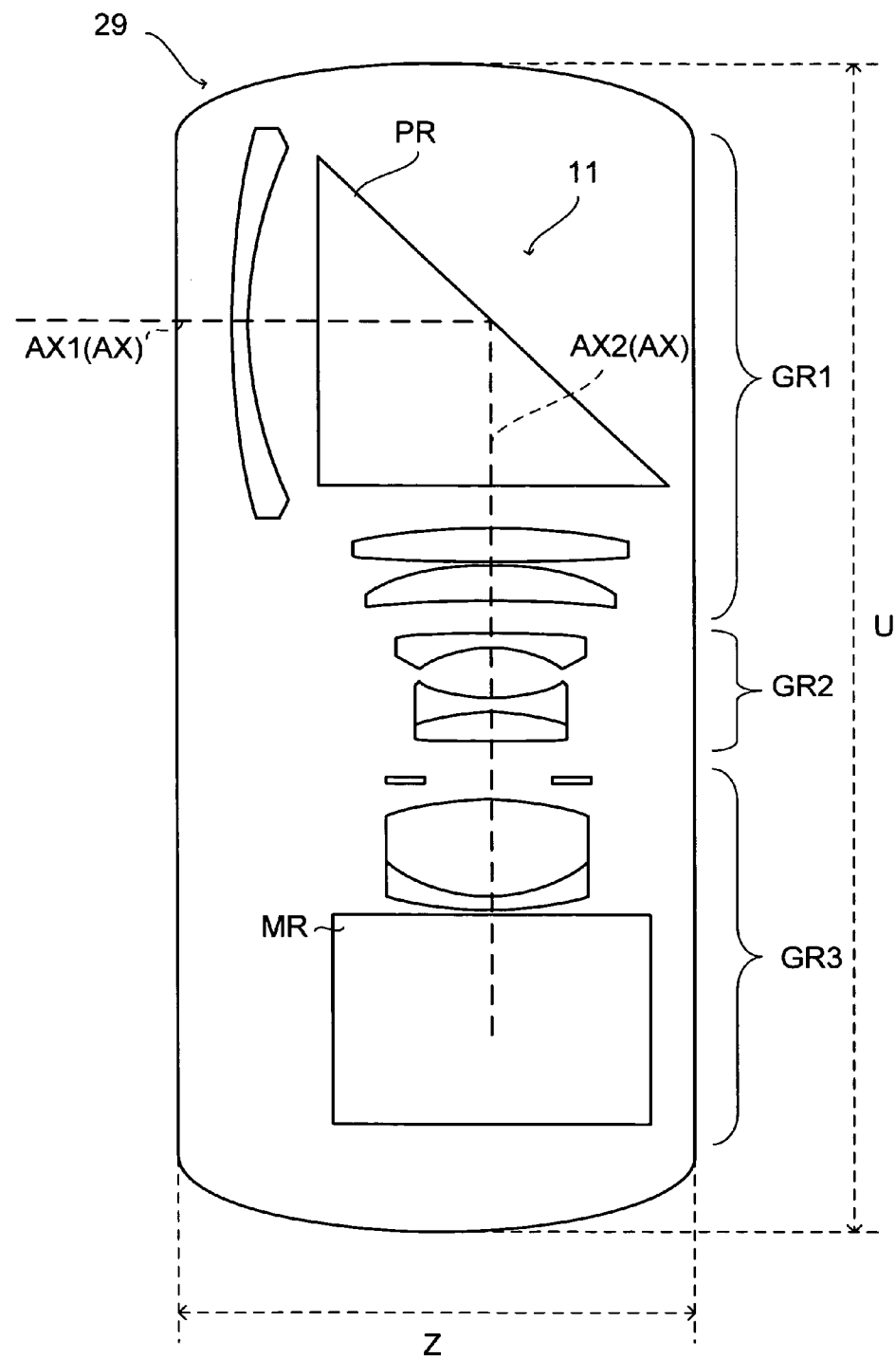
FIG. 6 is a schematic block diagram of the digital camera of each embodiment as viewed from the side.

FIGS. 5 and 6 are schematic block diagrams of a digital camera 29 as one example of an image taking apparatus of the invention. FIG. 5 shows the internal block construction of each part and an optical unit 1 (configured to include a variable magnification optical system 11 and an image sensor SR) built in the digital camera 29. FIG. 6 shows the side of the digital camera 29, indicating, in particular, one example of the variable magnification optical system 11 included in the optical unit 1. A U direction, a V direction, and a Z direction in the digital camera 29 denote the height, the width, and the depth, respectively.

As shown in FIG. 5, the digital camera 29 includes the variable magnification optical system 11, an optical system driving part 13, the image sensor SR, a signal processing part 14, a display part 15, a recording part 16, a recording medium 17, an operation part 18, a control part 19.

The variable magnification optical system 11 is an optical system that directs light from a photographing subject to the image sensor SR and also focuses this light on the light-receiving surface (image surface) of the image sensor SR. Therefore, the variable magnification optical system 11 may be expressed as an imaging optical system or a photographing optical system. The details of the variable magnification optical system 11 will be described later.

The optical system driving part 13 has several driving motors (optical system driving motors), not shown, and a transferring mechanism (a transferring mechanism for an optical system), not shown, for transferring driving force of these driving motors to lens units composing the variable magnification optical system 11. The optical system driving part 13 sets the focal length and focal position of the variable magnification optical system 11 by using the driving motors and the transferring mechanism. More specifically, the optical system driving part 13 sets the focal length and the focal position in accordance with directions provided from the control part 19.

The image sensor SR corresponds to, for example, an area sensor of a CCD (Charge Coupled Device), a CMOS (Complementary Metal Oxide Semiconductor) sensor, or the like, and receives a ray of light that has traveled via variable magnification optical system 11 and then converts it into an electrical signal (sensed data). Then, the image sensor SR outputs this sensed data to the signal processing part 14.

The signal processing part 14 processes electronic data (sensed data) outputted from the image sensor SR to thereby generate sensed image data based on the sensed data. This signal processing part 14 turns on and off processing operation in accordance with directions provided from the control part 19. In addition, in accordance with directions provided from the control part 19, the signal processing part 14 outputs sensed image data to the display part 15 and the recording part 16.

The display part 15 includes, for example, a liquid crystal panel, and displays sensed image data and the like outputted from the signal processing part 14, the usage condition of the digital camera 29, and the like.

The recording part 16 records sensed image data generated by the signal processing part 14 onto the recording medium 17 in accordance with directions provided from the control part 19. The recording part 16 also reads sensed image data from the recording medium 17 in accordance with directions provided from the control part 19 in response to operation made by the operation part 18 or the like.

The recording medium 17 may be, for example, incorporated inside the digital camera 29, or may be a detachable memory card, such as a flash memory or the like. Thus, the recording medium 17 may be any medium, such as an optical disc, a semiconductor memory, or the like, that is capable of recording sensed image data and the like.

The operation part 18 outputs to the control part 19 various operation directions given by the user or the like, and includes, for example, a shutter release button, an operation dial, and the like.

The control part 19 is a center portion that performs control of operation of the entire digital camera 29 and the like, and organically controls driving of each member of the digital camera 29 to thereby achieve overall control.

[2. Optical Unit]

Now, the optical unit 1 including the variable magnification optical system 11 and the image sensor SR will be described with reference to FIGS. 1, 5, and 6. The optical unit 1 shown as an example in FIGS. 5 and 6 is stored inside the digital camera 29. The optical unit 1 bends a ray of light with an optical prism PR and a reflective mirror MR.

Note that the optical unit 1 is not limited to such a lens system (bending optical system) that bends a ray, that is, the optical prism PR and the reflective mirror MR in FIGS. 5 and 6 may not be provided. Thus, in FIG. 1 showing the optical unit 1 shown in FIGS. 5 and 6 with the optical path shown in a row (lens construction diagram), the reflective mirror MR is omitted for convenience. In addition, the optical axes in this optical unit 1 are expressed as AXs (AX1 to AX3, see FIGS. 5 and 6).

Figure 1:
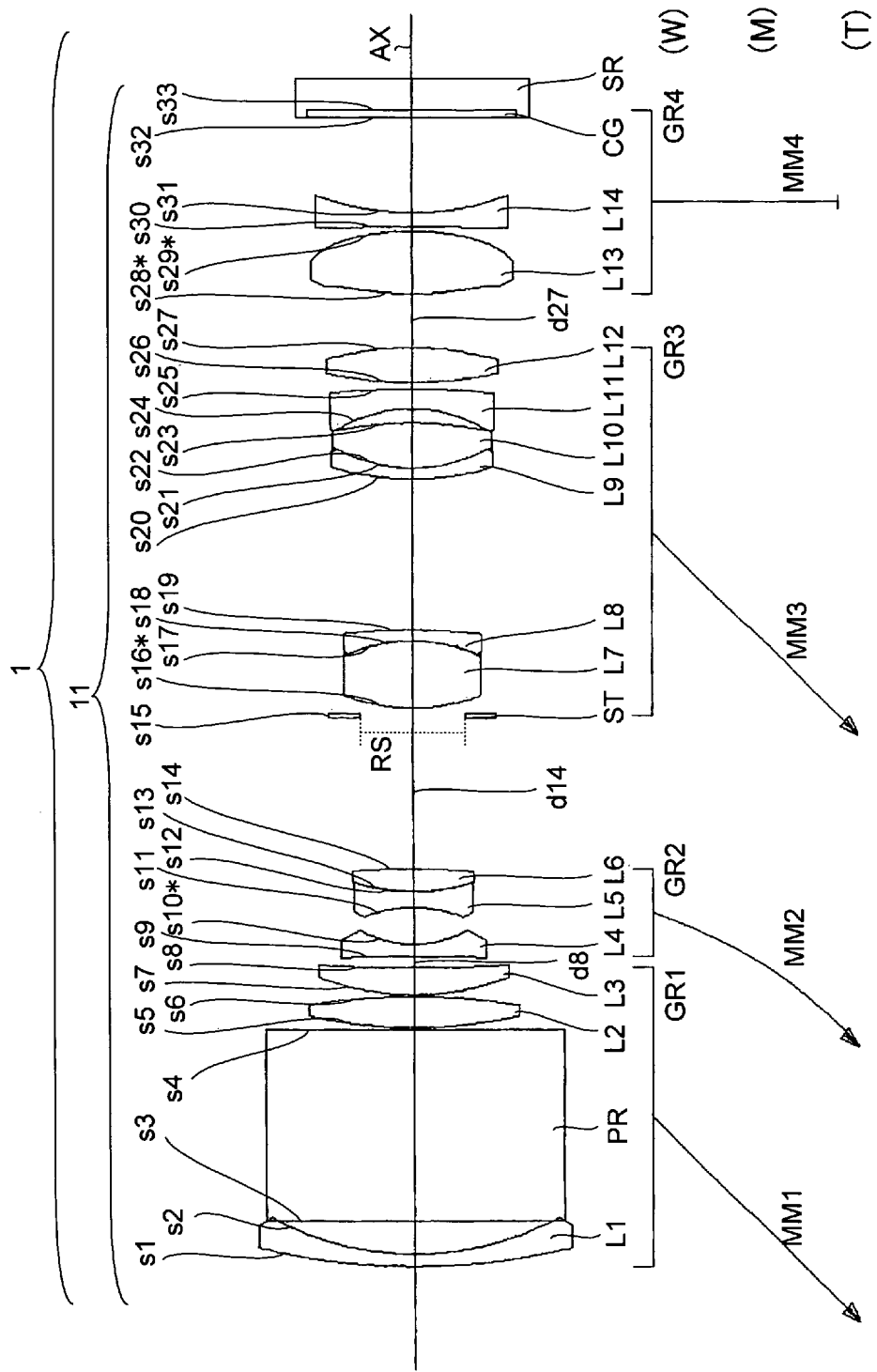
FIG. 1 is a lens construction diagram of an optical unit including a variable magnification optical system of Example 1.

Symbol "GRi" in this FIG. 1 denotes a lens unit, and symbol "Li" denotes a lens element. Further, symbol "si" denotes a surface (transmission surface or the like). Symbols (i) suffixed to "GRi", "Li", and "si" denote the order of position from the object side toward the image side. In addition, an aspherical surface is suffixed with "*" (asterisk). The variable magnification optical system 11 (and thus the optical unit 1) shown in this FIG. 1 is represented as Example 1.

[2-1. Construction of Optical Unit (Example 1)]

The variable magnification optical system 11 of the optical unit 1 includes, in order from the photographing subject (object side), a first lens unit GR1, a second lens unit GR2, a third lens unit GR3, and a fourth lens unit GR4 (including an image sensor SR).

[First Lens Unit]

The first lens unit GR1 includes form the object side, a first lens element (most object side lens element) L1, the optical prism (optical path changing element) PR, a second lens element L2, and a third lens element L3. This first lens unit GR1 has, as a whole, a "positive" optical power (refractive power). The optical power is defined by the reciprocal of the focal length.

The first lens element (front lens element) L1 is a negative meniscus lens element convex on the object side.

The optical prism (first optical path changing element) PR is a prism (for example, a right angle prism) capable of bending a ray from the object side at a right angle or the like. In the optical prism PR, s3 is an entrance surface for a ray, and s4 is an exit surface for a ray.

The second lens element L2 is a positive lens element (biconvex lens element) convex on both sides. The third lens element L3 is a positive meniscus lens element convex on the object side.

[Second Lens Unit]

The second lens unit GR2 includes in order from the object side, a fourth lens element L4, a fifth lens element L5, and a sixth lens element L6. This second lens unit GR2 has, as a whole, a "negative" optical power.

The fourth lens element L4 is a negative lens element (biconcave lens element) concave on both sides. In this fourth lens element L4, s10 is an aspherical surface (refractive optical surface in an aspherical shape, a surface having a refractive capability equivalent to that of an aspherical surface, or the like).

The fifth lens element L5 is a negative lens element concave on both sides. The sixth lens element L6 is a positive lens element convex on both sides. The fifth lens element L5 and the sixth lens element L6 compose a cemented lens element formed by cementing s12 and s13 together. Methods of cementing them together include, for example, cementing with a bonding agent (methods of cementing for cemented lens elements to be described later also include cementing with a bonding agent or the like).

[Third Lens Unit]

The third lens unit GR3 includes from the object side, an optical aperture stop ST, a seventh lens element L7, an eighth lens element L8, a ninth lens element L9, a tenth lens element L10, an eleventh lens element L11, and a twelfth lens element L12. This third lens unit GR3 has, as a whole, a positive optical power.

The optical aperture stop ST is an aperture stop with a variable aperture diameter RS. This optical aperture stop ST is integrated with the third lens unit GR3. In FIG. 1, this optical aperture stop ST itself is represented by s15 for convenience.

The seventh lens element L7 is a positive lens element convex on both sides. The surface s16 of this seventh lens element L7 forms an aspherical surface. The eighth lens element L8 is a negative meniscus lens element concave on the object side. The seventh lens element L7 and the eighth lens element L8 compose a cemented lens element formed by cementing s17 and s18 together.

The ninth lens element L9 is a negative meniscus lens element convex on the object side. The tenth lens element L10 is a positive lens element convex on both sides. The ninth lens element L9 and the tenth lens element L10 compose a cemented lens element formed by cementing s21 and s22 together.

The eleventh lens element L11 is a negative meniscus lens element concave on the object side. The twelfth lens element L12 is a positive lens element convex on both sides.

[Fourth Lens Unit]

The fourth lens unit GR4 includes in order from the object side, a thirteenth lens element L13, a fourteenth lens element L14, a cover glass CG, and an image sensor SR. This fourth lens unit GR4 has, as a whole, a "positive" optical power.

The thirteenth lens element L13 is a positive lens element convex on both sides. The fourteenth lens element L14 is a negative lens element concave on both sides. The surfaces s28 and s29 of this thirteenth lens element L13 each form an aspherical surface.

The cover glass CG is a glass formed of two surfaces (s32, s33) and so disposed as to be extremely close to the light-receiving surface of the image sensor SR. This cover glass CG may serve as an optical filter (for example, infrared cut filter) having a predetermined cutoff frequency characteristic determined by the pixel pitch of the image sensor SR (although the cover glass CG itself has no optical power).

[Image Sensor]

The image sensor SR is included in the fourth lens unit GR4 and also so arranged as to be fixed (that is, the fourth lens unit GR4 is stationary; the same applies to Examples 2 to 7 to be described later).

[2-2. Construction Data for the Variable Magnification Optical System (Example 1)]

Next, construction data for the variable magnification optical system 11 of Example 1 will be described with reference to Tables 1 and 2.

Symbol ri in this Table 1 denotes a radius of curvature (in mm) of each surface (si). An aspherical surface is suffixed with an asterisk (*). Symbol di denotes an axial surface distance (in mm) between the i-th surface (si) and the (i+1)-th surface (si+1). In a case where the axial surface distance varies by zooming, di at the wide-angle end (W), di at the intermediate focal length position (M), and di at the telephoto end (T) are indicated in this order.

Symbols Ni and vi denote the refractive index (nd) and Abbe number (vd) possessed by a medium at the axial surface distance (di). The refractive index (nd) and the Abbe number (vd) are provided for a d-line (wavelength 587.56 nm).

The "focal length position" implies the wide-angle end (W; shortest focal length position) to the intermediate focal length position (M) to the telephoto end (T; longest focal length position). Symbols f and FNO denote the focal length (in mm) and F-number, respectively, of the entire system corresponding to the respective focal length positions (W), (M), and (T).

The aspherical surface described above is defined by formula below (definitional equation 1):

$$X(H) = C_0 \cdot H^2 / (1 + \sqrt{1 - \epsilon \cdot C_0^2 \cdot H^2}) + \Sigma A j \cdot H^j \quad \text{(Definitional equation 1)},$$

where

| | |
|---|---|
| H | represents the height in the direction perpendicular to the optical axis AX; |
| X (H) | represents the displacement in the direction of the optical axis AX at the height H; |
| $C_0$ | represents the paraxial curvature (=1/ri); |
| $\epsilon$ | represents the quadric surface parameter; |
| j | represents the order of the aspherical surface; and |
| Aj | represents the aspherical surface coefficient of order j. |

Table 2 shows data on the aspherical surfaces (aspherical surface data). Here, it should be noted that the coefficient of any term that does not appear in the tables equals zero, and that, for all the data, E-n stands for $\times 10^{-n}$.

[2-3. Movement of Each Lens Unit in the Optical Unit]

[2-3-1. Zooming]

Now, the movement of each of the lens units (GR1 to GR4) will be described with reference to FIG. 1. The optical unit 1 usually varies gaps between the lens units along the optical axis AX in zooming, such as magnification variation or the like. For example, the optical unit 1 of FIG. 1 moves part of the lens units (the first lens unit GR1 to the third lens unit GR3) in zooming.

In such zooming, the distance between the lens units (interunit distance) varies. In FIG. 1, only an axial surface distances (di) that vary during the zooming are numbered. More specifically, d8, d14, and d27 are shown in the figure. Arrows MMi in the figure schematically shows the movement of the lens unit from the wide-angle end (W) to the intermediate focal length position (M) and further from the intermediate focal length position (M) to the telephoto end (T). The letter i in MMi denotes the place in order from the object side toward the image side; therefore, this letter corresponds to the place of a respective lens unit.

FIGS. 2A to 2C through 4A to 4C show aberration occurring with the variable magnification optical system 11 in zooming. More specifically, FIGS. 2A to 2C show the aberration at the wide-angle end (W), FIGS. 3A to 3C show the aberration at the intermediate focal length position (M), and FIGS. 4A to 4C show the aberration at the telephoto end (T).

FIGS. 2A, 3A, and 4A show the spherical aberration and sine conditions. In the figures, a line d represents the spherical aberration (in mm) for the d-line, and a broken line SC represents a deviation (in mm) from the sine condition. In these figures, FNOs (f-numbers) are also represented.

FIGS. 2B, 3B, and 4B show the astigmatism. A broken line DM indicates the astigmatism (in mm) for the d-line on the meridional surface. A line DS indicates the astigmatism (in mm) for the d-line on the sagittal surface. In each of these figures, the maximum image height on the light-receiving surface of the image sensor SR (the distance from the optical axis AX), Y' (in mm), is also represented.

FIGS. 2C, 3C, and 4C show the distortion. In the figures, a solid line indicates the distortion (in %) for the d-line. In each of these figures, Y' is also represented.

[3. Various Features]

As described above, the variable magnification optical system 11 is provided with the lens units (for example, GR1 to GR4) that focus a ray of light from the object side on the image sensor SR. Of the lens units, the lens unit located at the first position from the object side toward the image side (first lens unit GR1) includes an optical prism PR for changing the optical path. Such a variable magnification optical system 11 performs magnification variation by changing gaps between the lens units.

The variable magnification optical system 11 satisfies conditional formulae (1) to (3) below. Note that not all of these conditional formulae need to be satisfied. Satisfying only one of the conditional formulae exerts corresponding action and effect on the variable magnification optical system 11. Needless to say, satisfying a plurality of conditional formulae definitely exerts more favorable action and effect on the variable magnification optical system 11 of the invention.

The conditional formulae (1) to (3) are as follows:

| | |
|---|---|
| 4 < ft/fw | Conditional formula (1), |
| 1.72 < n_PR | Conditional formula (2), |
| 35 < v_PR | Conditional formula (3), | where

| | |
|---|---|
| ft | denotes the focal length of the entire variable magnification optical system 11 (the entire system) at the telephoto end [in mm], |
| fw | denotes the focal length of the entire system at the wide-angle end [in mm], |
| n_PR | denotes the refractive index of the optical prism PR for a d-line, and |
| v_PR | denotes the Abbe number of the optical prism PR for a d-line. |

The conditional formula (1) represents the zoom ratio of the variable magnification optical system 11 (and thus the optical unit 1). Thus, satisfying this conditional formula (1) results in a much higher zoom ratio than the zoom ratio (for example, approximately 3×) of a conventional digital camera. That is, the variable magnification optical system 11 provided with a high zoom ratio is achieved. Thus, the significance of the zooming performance in the variable magnification optical system 11 (magnification variation performance) is large, thus permitting achieving user benefits.

The conditional formula (2) defines a preferable range of the refractive index of the optical prism PR. Typically, if the refractive index of the optical prism PR is relatively low, the air gap between the optical prism PR and the lens units located in front thereof and the air gap between the optical prism PR and the lens unit located at the back thereof are likely to be relatively long accordingly. Thus, if the refractive index does not satisfy the conditional formula (2), the air gap between the optical prism PR and the lens unit in front thereof and the air gap between the optical prism PR and the lens unit at the back thereof are large, thus leading to upsizing of the variable magnification optical system 11. Therefore, the variable magnification optical system 11 including the optical prism PR that satisfies the conditional formula (2) is relatively compact.

When the optical prism PR having a relatively large refractive index (that is, relatively strong optical power) that satisfies the conditional formula (2) is included in the variable magnification optical system 11 having a high zoom ratio (magnification variation ratio) that satisfies the conditional formula (1), this large refractive index contributes to downsizing of the variable magnification optical system 11.

The conditional formula (3) defines a favorable range of the Abbe number of the optical prism PR. Typically, if the Abbe number of the optical prism PR is relatively small, chromatic aberration is likely to occur accordingly. In particular, when the optical prism PR is decentered (in a case such as where the surface of the optical prism PR is inclined from a desired position, or the like), the optical prism having a relatively small Abbe number is more likely to encounter remarkable chromatic aberration than the optical prism PR having a relatively large Abbe number.

Thus, with the Abbe number not satisfying the conditional formula (3), remarkable chromatic aberration attributable to the optical prism PR occurs, hindering the performance enhancement of the variable magnification optical system 11. Therefore, the variable magnification optical system 11 including the optical prism PR that satisfies conditional formula (3) can suppress chromatic aberration (achieve performance enhancement) to some extent.

It is preferable that the optical prism PR in the variable magnification optical system 11 of the invention satisfy conditional formula (4) below:

$$0.2 < d\_PR/ft < 0.4 \qquad \text{Conditional formula (4)},$$

where

| | |
|---|---|
| d_PR | denotes the optical path length of the optical prism PR [in mm], and |
| ft | denotes the focal length of the entire variable magnification optical system 11 (the entire system) at the telephoto end [in mm]. |

The conditional formula (4) defines the appropriate optical path length of the optical prism PR and thus the appropriate size of the optical prism PR. If d_PR/ft is equal to or smaller than the lower limit value of the conditional formula (4), the size of the optical prism PR is relatively small. Therefore, if such an optical prism PR is included, the variable magnification optical system 11 is likely to be small.

However, when the optical prism PR is relatively small, for example, when the optical prism PR is small relative to the lens element (object side lens element) located closer to the object than the optical prism PR, part of a ray of light transmitted through the object side lens element may not pass through the optical prism PR and thus may not travel to the lens element (image side lens element) located at the image side. This is attributable to the fact that the size of a beam of light passing through the object side lens element is larger than the surface size of the optical prism PR. Therefore, in this case, the off-axis beam of light hardly passes through the optical prism PR.

Such a phenomena is referred to as "vignetting". The occurrence of such vignetting in an off-axis beam of light results in failure to achieve effective use of a ray of light, which is undesirable. Especially if d_PR/ft is equal to or smaller than the lower limit value of the conditional formula (4), the beam region undergoing vignetting is relatively large, which is extremely undesirable. Therefore, in this case, although the full length of the variable magnification optical system 11 is relatively compact, deterioration in the optical performance is likely to occur (the effective use of a ray of light cannot be achieved).

On the other hand, if d_PR/ft is equal to or larger than the upper limit value of the conditional formula (4), the size of the optical prism PR is relatively large. Therefore, when such an optical prism PR is included, the size of the variable magnification optical system 11 is likely to be large.

However, the relatively large optical prism PR permits all rays of light transmitted through the object side lens elements to pass through the optical prism PR and travel to the image side lens elements (that is, no beam of light undergoes vignetting), thus permitting the effective use of a ray of light. Therefore, if d_PR/ft is equal to or larger than the upper limit value of the conditional formula (4), although an improvement in the optical performance of the variable magnification optical system 11 can be achieved to some extent (the effective use of a ray of light is possible), the full length of the variable magnification optical system 11 is likely to be relatively long.

Based on the above, if d_PR/ft is larger than the lower limit value of the conditional formula (4), deterioration in the optical performance of the variable magnification optical system 11 (thus optical unit 1) is suppressed. On the other hand, if d_PR/ft is smaller than the upper limit value of the conditional formula (4), extreme upsizing of the variable magnification optical system 11 attributable to the size of the optical prism PR is suppressed. Thus, within the range defined by the conditional formula (4), the variable magnification optical system 11 can, while being compact, achieve high-performance.

It is preferable that, in the variable magnification optical system 11, a lens element having a negative optical power (first lens element L1, which is a negative lens element, in Example 1) be included at the most object side in the lens unit at the first position (first lens unit GR1), and that conditional formula (5) below be satisfied:

$$-3 < f\_GR1Los/f1 < -1 \qquad \text{Conditional formula (5)},$$

where

| | |
|---|---|
| f_GR1Los | denotes the focal length of the negative lens element located at the most object side in the first lens unit GR1 [in mm]; and |
| f1 | denotes the focal length of the first lens unit GR1 [in mm]. |

Typically, the effective diameter of the first lens unit GR1 is determined by the largest angle of view at the wide-angle end and the entrance pupil position. The arrangement of the negative lens element (first lens element L1) at the most object side in the first lens unit GR1 locates the entrance pupil position relatively closer to the object, thus resulting in a relatively small effective diameter of the most object side lens element.

The conditional formula (5) defines the refractive power of the negative lens element of the first lens unit GR1. If f_GR1Los/f1 is equal to or smaller than the lower limit value of the conditional formula (5), the refractive power of the most object side lens element is relatively weak, so that chromatic aberration, distortion, and the like attributable to the negative lens element is less likely to occur.

However, the relatively weak refractive power of the most object side lens element shifts the entrance pupil position toward the image surface side, thus, resulting in a relatively large effective diameter of the most object side lens element. Such a large effective diameter of the most object side lens element results in a large size of the optical prism PR, and thus a large size of the variable magnification optical system 11. Therefore, if f_GR1Los/f1 is equal to or smaller than the lower limit value of the conditional formula (5), an improvement in the optical performance of the variable magnification optical system 11 can be achieved to some extent (chromatic aberration, distortion, and the like can be suppressed), but the full length of the variable magnification optical system 11 is likely to be relatively large.

On the other hand, if f_GR1Los/f1 is equal to or larger than the upper limit value of the conditional formula (5), the refractive power of the most object side lens element is relatively strong, so that chromatic aberration, distortion, and the like attributable to the negative lens element are likely to occur. However, the relatively strong refractive power of the most object side lens element cannot shift the entrance pupil position to the image surface side, so that the effective diameter of the most object side lens element remains relatively small. Thus, in accordance with the effective diameter of the most object side lens element, the optical prism PR can be small-sized. Therefore, if f_GR1Los/f1 is equal to or larger than the upper limit value of the conditional formula (5), the full length of the variable magnification optical system 11 is likely to be relatively short, although deterioration in the optical performance of the variable magnification optical system 11 (chromatic aberration, distortion, and the like) is likely to occur.

Based on the above, if f_GR1Los/f1 is larger than the lower limit value of the conditional formula (5), extreme upsizing of the variable magnification optical system 11 attributable to the size of the optical prism PR (and thus optical unit 1) is suppressed. On the other hand, if f_GR1Los/f1 is smaller than the upper limit value of the conditional formula (5), deterioration in the optical performance of the variable magnification optical system 11 is suppressed. Thus, within the range defined by the conditional formula (5), the variable magnification optical system 11 can, while being compact, achieve high-performance.

Associating the variable magnification optical system 11 of Example 1 with the conditional formulae (1) to (5) provides the following results: (see Table. 15 to be described later)

ft/fw of Example 1=4.73, n_PR of Example 1=1.88300, v_PR of Example 1=40.79, d_PR/ft of Example 1=0.33, and f_GR1Los/f1 of Example 1=−1.81.

In the variable magnification optical system 11, the first lens unit GR1 has a positive optical power and the optical aperture stop ST is located closer to the image than the first lens unit GR1. With such an image-taking optical system OS, for example, compared to an image-taking optical system having the first lens unit with a negative optical power, a small aperture diameter of the optical aperture stop ST can be provided, thus permitting simplified aperture mechanism of the optical aperture stop ST in a slim image-taking optical system OS.

In terms of effectively performing various aberration corrections, it is preferable that in the first lens unit GR1, at least two lens elements having a positive optical power (the second lens element L2 and the third lens element L3 in Example 1) be located closer to the image than the optical prism PR. For example, if only one lens element is located closer to the image than the optical prism PR, it is preferable in terms of aberration correction that the lens element is aspherical. However, locating at least two lens elements having a positive optical power closer to the image than the optical prism PR permits effective aberration correction even if they are not aspherical.

[4. Other Examples]

Note that the variable magnification optical system 11 is not limited to the variable magnification optical system 11 of Example 1 described above. Thus, referring to FIGS. 7A to 7C through 30A to 30C, the optical units 1 including different variable magnification optical systems 11 (Examples 2 to 7) will be described which have the features described above and which provides action and effect corresponding to these features.

Table 15 shows results of the conditional formulae (1) to (5) corresponding to the variable magnification optical systems 11 of Examples 2 to 7.

Lens units of the variable magnification optical systems 11 in Examples 2 to 7, as is the case with those in Example 1, have: in order from a photographing subject, a first lens unit GR1, a second lens unit GR2, a third lens unit GR3, and a fourth lens unit GR4 (including an image sensor SR), with optical power arrangement of positive, negative, positive, and positive.

[4-1. Variable Magnification Optical System of Example 2 (See FIG. 7)]

[First Lens Unit GR1]

The first lens unit GR1 includes: in order from the object side, a first lens element (most object side lens element) L1, an optical prism PR, a second lens element L2, and a third lens element L3, respectively having the following properties:

| | |
|---|---|
| First lens element L1 | a negative meniscus lens element convex on the object side; |
| Second lens element L2 | a positive lens element convex on both sides; and |
| Third lens element L3 | a positive meniscus lens element convex on the object side. |

[Second Lens Unit]

The second lens unit GR2 includes: in order from the object side, a fourth lens element L4, a fifth lens element L5, and a sixth lens element L6, respectively having the following properties.

| | |
|---|---|
| Fourth lens element L4 | a negative meniscus lens element convex on the object side (s10 is aspherical); |
| Fifth lens element L5 | a negative lens element concave on both sides; and |
| Sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, an eleventh lens element L11, and a twelfth lens element L12, respectively having the following properties:

| | |
|---|---|
| Seventh lens element L7 | a positive lens element convex on both sides (s16 is aspherical); |
| Eighth lens element L8 | a negative meniscus lens element concave on the object side; |
| Ninth lens element L9 | a negative meniscus lens element convex on the object side; |
| Tenth lens element L10 | a positive lens element convex on both sides; |
| Eleventh lens element L11 | a negative meniscus lens element concave on the object side; and |
| Twelfth lens element L12 | a positive lens element convex on both sides. |

The seventh lens element L7 and the eighth lens element L8 compose cemented lens element by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a thirteenth lens element L13, a fourteenth lens element L14, and a cover glass CG (glass formed of two surfaces having s32 and s33), respectively having the following properties:

| | |
|---|---|
| Thirteenth lens element L13 | a positive lens element convex on both sides (s28 and s29 are aspherical); and |
| Fourteenth lens element L14 | a negative lens element concave on both sides. |

[Construction Data of the Variable Magnification Optical System (Example 2)]

Construction data of the variable magnification optical system 11 of Example 2 is shown in Tables. 3 and 4, which are expressed in the same manner as Tables. 1 and 2 described above.

[Movement of Each Lens Unit in the Optical Unit]

[Zooming]

Figure 7:
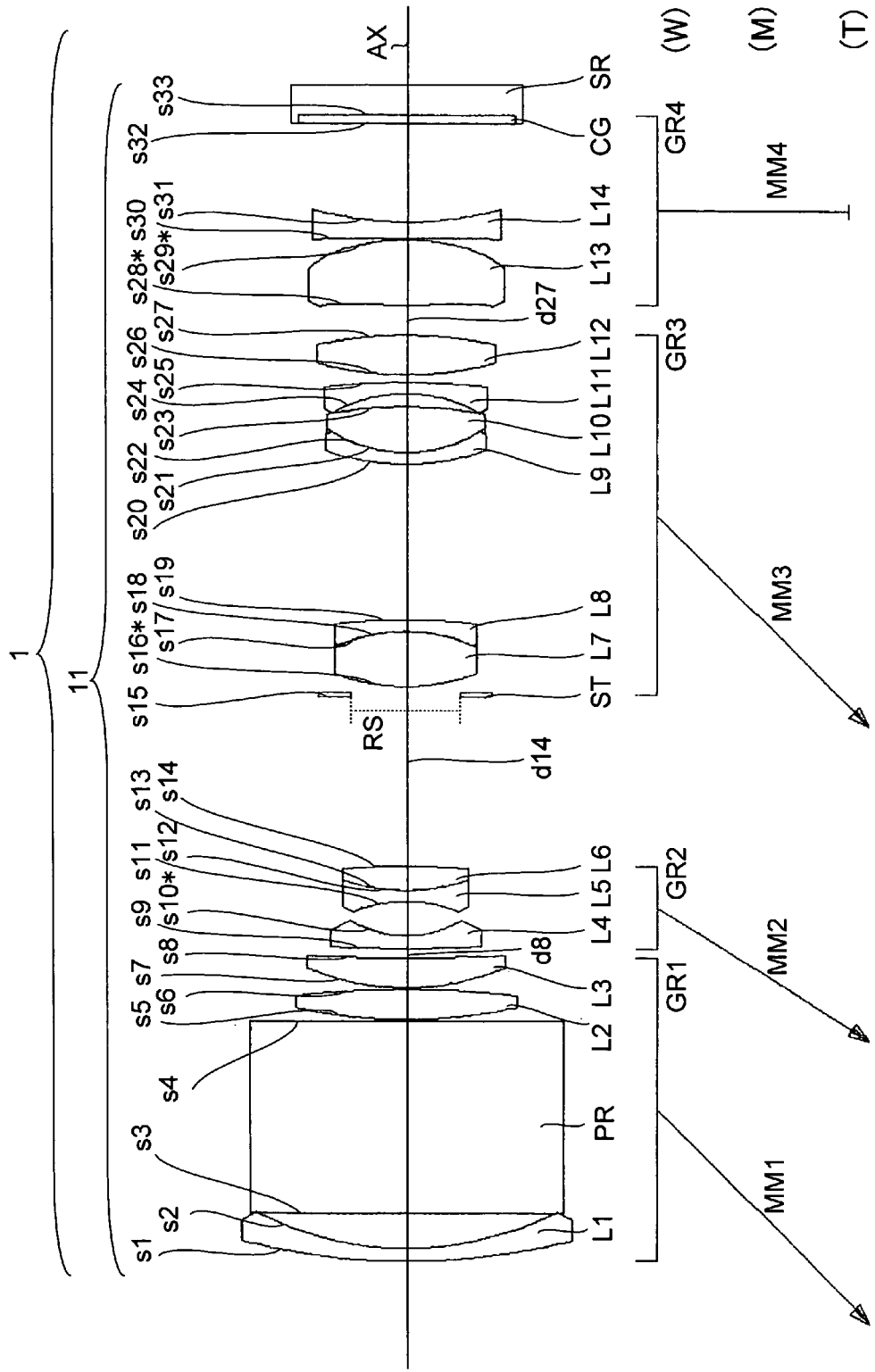
FIG. 7 is a lens construction diagram of an optical unit including a variable magnification optical system of Example 2.

The variable magnification optical system 11 of Example 2 moves toward the object side at least part of the lens units (the first lens unit GR1 to the third lens unit GR3) during zooming as shown in FIG. 7. Thus, in FIG. 7, only an axial space distance (di) that fluctuates following the zooming is numbered. More specifically, d8, d14, and d27 are shown in the figure.

FIGS. 8 to 10 show aberration occurring in the variable magnification optical system 11 of Example 2 during zooming. These FIGS. 8A to 8C through FIGS. 10A to 10C are expressed in the same manner as FIGS. 2A to 2C through FIGS. 4A to 4C.

[4-2. Variable Magnification Optical System of Example 3(See FIG. 11)]

[First Lens Unit GR1]

The first lens unit GR1 includes: in order from the object side, a first lens element (most object side lens element) L1, an optical prism PR, a second lens element L2, and a third lens element L3, respectively having the following properties:

| | |
|---|---|
| First lens element L1 | a negative meniscus lens element convex on the object side; |
| Second lens element L2 | a positive lens element convex on both sides; and |
| Third lens element L3 | a positive meniscus lens element convex on the object side. |

[Second Lens Unit]

The second lens unit GR2 includes: in order from the object side, a fourth lens element L4, a fifth lens element L5, and a sixth lens element L6, respectively having the following properties:

| | |
|---|---|
| Fourth lens element L4 | a negative lens element concave on both sides (s10 is aspherical); |
| Fifth lens element L5 | a negative lens element concave on both sides; and |
| Sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, and an eleventh lens element L11, respectively having the following properties:

| | |
|---|---|
| Seventh lens element L7 | a positive lens element convex on both sides (s16 is aspherical); |
| Eighth lens element L8 | a negative meniscus lens element concave on the object side; |
| Ninth lens element L9 | a negative meniscus lens element convex on the object side; |
| Tenth lens element L10 | a positive meniscus lens element convex on the object side; and |
| Eleventh lens element L11 | a positive meniscus lens element convex on the object side (s24 and s25 are aspherical). |

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12 and a cover glass CG (glass formed of two surfaces having s28 and s29), and the twelfth lens element L12 has the following property:

| | |
|---|---|
| Twelfth lens element L12 | a positive lens element convex on the object side (s26 and s27 are aspherical). |

[Construction Data of Variable Magnification Optical System (Example 3)]

Construction data of the variable magnification optical system 11 of Example 3 is shown in Tables. 5 and 6, which are expressed in the same manner as Tables. 1 and 2 described above.

[Movement of Each Lens Unit in the Optical Unit]

[Zooming]

Figure 11:
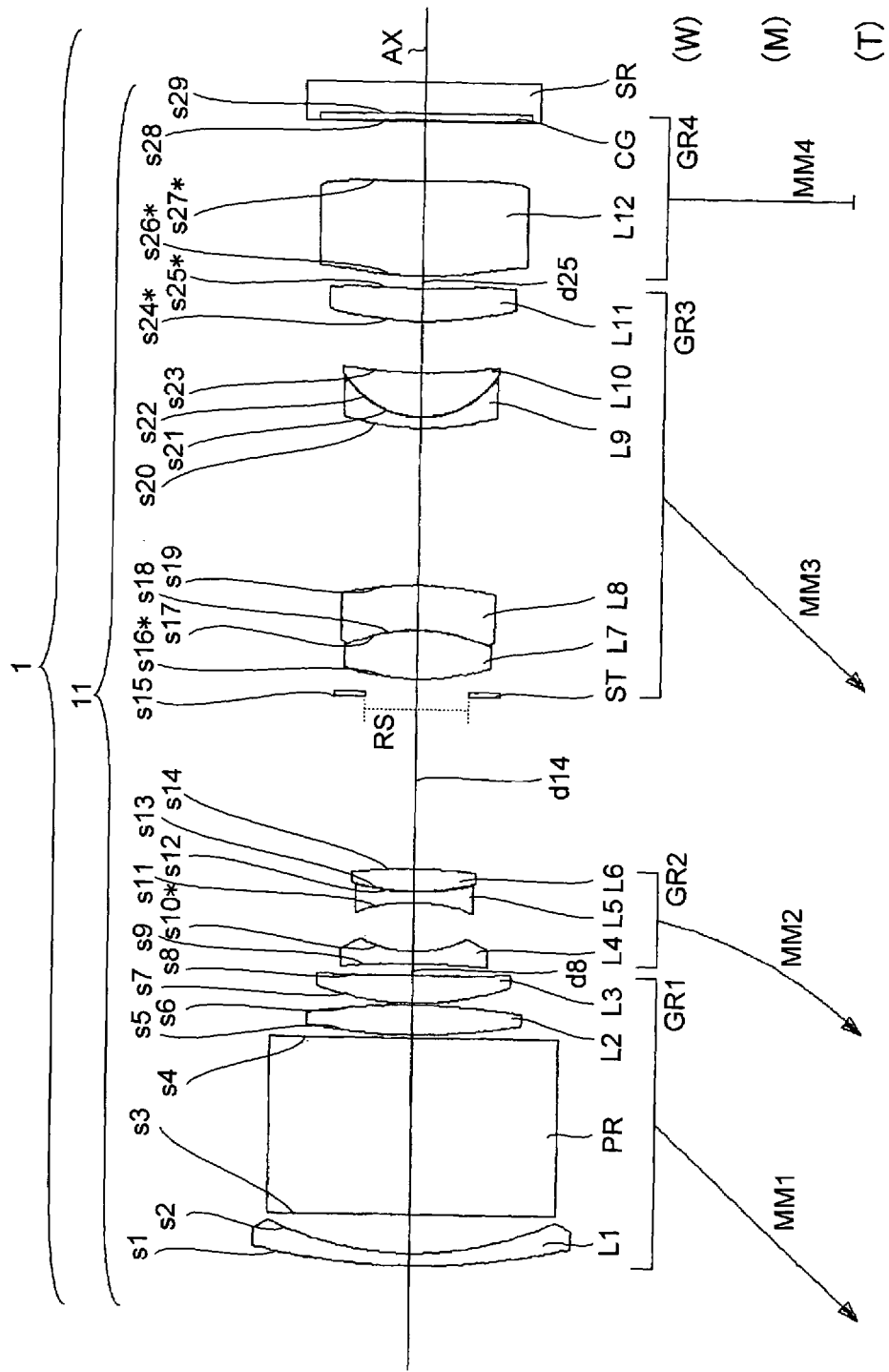
FIG. 11 is a lens construction diagram of an optical unit including a variable magnification optical system of Example 3.

The variable magnification optical system 11 of Example 3 moves toward the object side at least part of the lens units (first lens unit GR1 to third lens unit GR3) during zooming, as shown in FIG. 11. Thus, in FIG. 11, only an axial surface distance (di) that fluctuates following zooming is numbered. More specifically, d8, d14, and d25 are shown.

FIGS. 12A to 12C through FIGS. 14A to 14C show aberration occurring in the variable magnification optical system 11 of Example 3 during zooming. These FIGS. 12A to 12C through FIGS. 14A to 14C are expressed in the same manner as FIGS. 2A to 2C through FIGS. 4A to 4C.

[4-3. Variable Magnification Optical System of Example 4 (See FIG. 15)]

[First Lens Unit GR1]

The first lens unit GR1 includes: in order from the object side, a first lens element (most object side lens element) L1, an optical prism PR, a second lens element L2, and a third lens element L3, respectively having the following properties:

| | |
|---|---|
| The first lens element L1 | a negative meniscus lens element convex on the object side; |
| The second lens element L2 | a positive lens element convex on both sides; and |
| The third lens element L3 | a positive lens element convex on both sides. |

[Second Lens Unit]

The second lens unit GR2 includes: in order from the object side, a fourth lens element L4, a fifth lens element L5, and a sixth lens element L6, respectively having the following properties:

| | |
|---|---|
| The fourth lens element L4 | a negative lens element concave on both sides (s10 is aspherical); |
| The fifth lens element L5 | a negative lens element concave on both sides; and |
| The sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, and an eleventh lens L1, respectively having the following properties:

| | |
|---|---|
| The seventh lens element L7 | a positive lens element convex on both sides (s16 is aspherical); |
| The eighth lens element L8 | a negative meniscus lens element concave on the object side; |
| The ninth lens element L9 | a negative meniscus lens element convex on the object side; |
| The tenth lens element L10 | a positive meniscus lens element convex on the object side; and |
| The eleventh lens element L11 | a positive lens element convex on both sides (s24 and s25 are aspherical). |

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

| | |
|---|---|
| The twelfth lens element L12 | a positive lens element convex on both sides (s26 and s27 are aspherical); and |
| The thirteenth lens element L13 | a negative lens element concave on both sides |

[Construction Data of Variable Magnification Optical System (Example 4)]

Construction data of the variable magnification optical system 11 of Example 4 is shown in Tables. 7 and 8, which are expressed in the same manner as Tables. 1 and 2 described above.

[Movement of Each Lens Unit in the Optical Unit]

[Zooming]

Figure 15:
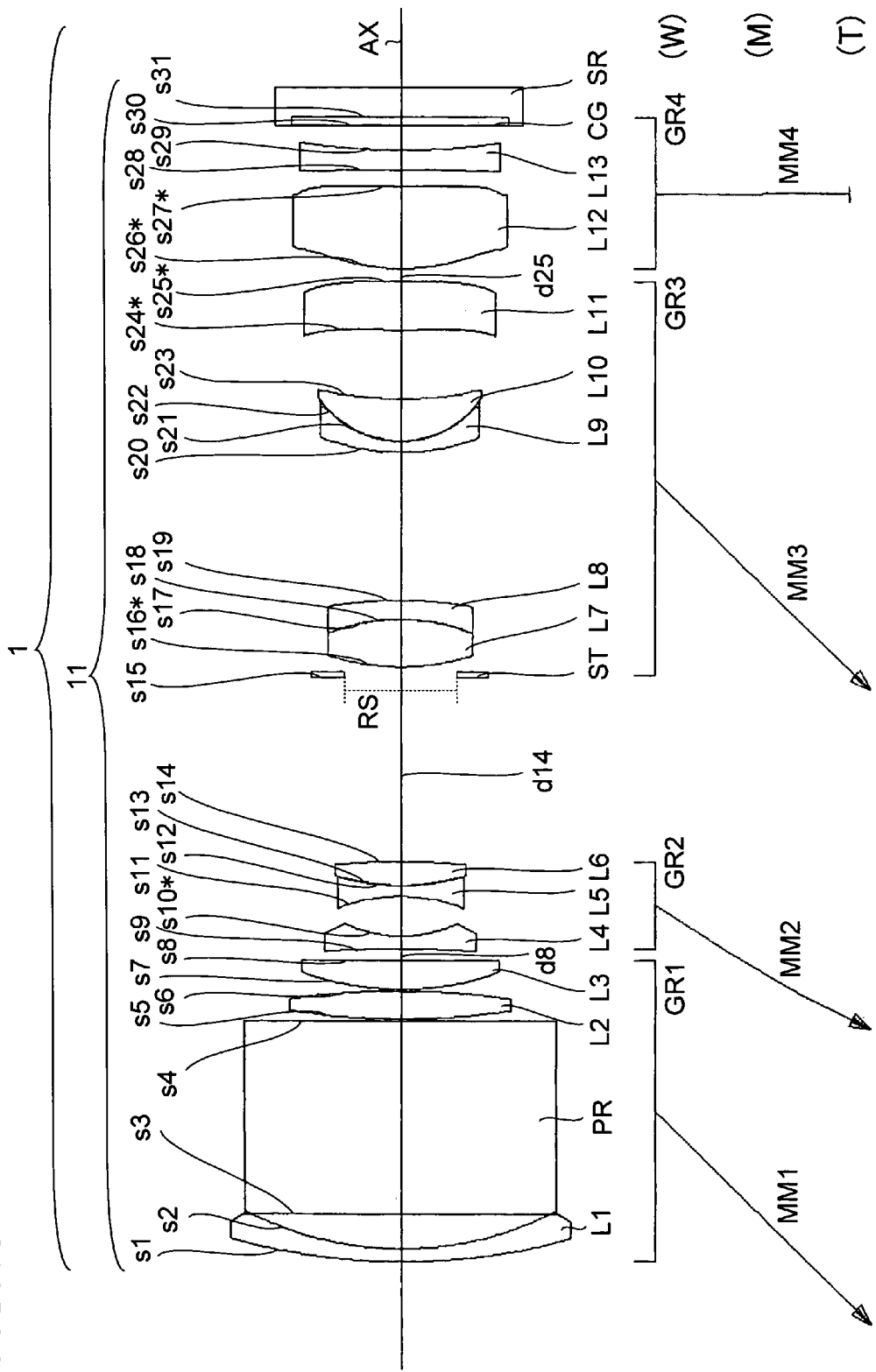
FIG. 15 is a lens construction diagram of an optical unit including a variable magnification optical system of Example 4.

The variable magnification optical system 11 of Example 4 moves toward the object side at least part of the lens units (the first lens unit GR1 to the third lens unit GR3) during zooming as shown in FIG. 15. Thus, in FIG. 15, only an axial space distance (di) that fluctuates following the zooming is numbered. More specifically, d8, d14, and d25 are shown in the figure.

FIGS. 16A to 16C through FIGS. 18A to 18C show aberration occurring in the variable magnification optical system 11 of Example 4 during zooming. These FIGS. 16A to 16C through FIGS. 18A to 18C are expressed in the same manner as FIGS. 2A to 2C through FIGS. 4A to 4C.

[4-4. Variable Magnification Optical System of Example 5 (See FIG. 19)]

[First Lens Unit]

The first lens unit GR1 includes: in order from the object side, a first lens element (most object side lens element) 1, an optical prism PR, a second lens element L2, and a third lens element L3, respectively having the following properties:

| | |
|---|---|
| The first lens element L1 | a negative meniscus lens element convex on the object side; |
| The second lens element L2 | a positive lens element convex on both sides; and |
| The third lens element L3 | a positive lens element convex on both sides. |

[Second Lens Unit]

The second lens unit GR2 includes: in order from the object side, a fourth lens element L4, a fifth lens element L5, and a sixth lens element L6, respectively having the following properties:

| | |
|---|---|
| The fourth lens element L4 | a negative lens element concave on both sides (s10 is aspherical); |
| The fifth lens element L5 | a negative lens element concave on both sides; and |
| The sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, and an eleventh lens L11, respectively having the following properties:

| | |
|---|---|
| The seventh lens element L7 | a positive lens element convex on both sides (s16 is aspherical); |
| The eighth lens element L8 | a negative meniscus lens element concave on the object side; |
| The ninth lens element L9 | a negative meniscus lens element convex on the object side; |
| The tenth lens element L10 | a positive meniscus lens element convex on the object side; and |
| The eleventh lens element L11 | positive meniscus lens element convex on the object side (s24 and s25 are aspherical). |

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

| | |
|---|---|
| The twelfth lens element L12 | a positive lens element convex on both sides (s26 and s27 are aspherical); and |
| The thirteenth lens element L13 | a negative lens element concave on both sides. |

[Construction Data of Variable Magnification Optical System (Example 5)]

Construction data of the variable magnification optical system 11 of Example 5 is shown in Tables. 9 and 10, which are expressed in the same manner as Tables. 1 and 2 described above.

[Movement of Each Lens Unit in the Optical Unit]

[Zooming]

Figure 19:
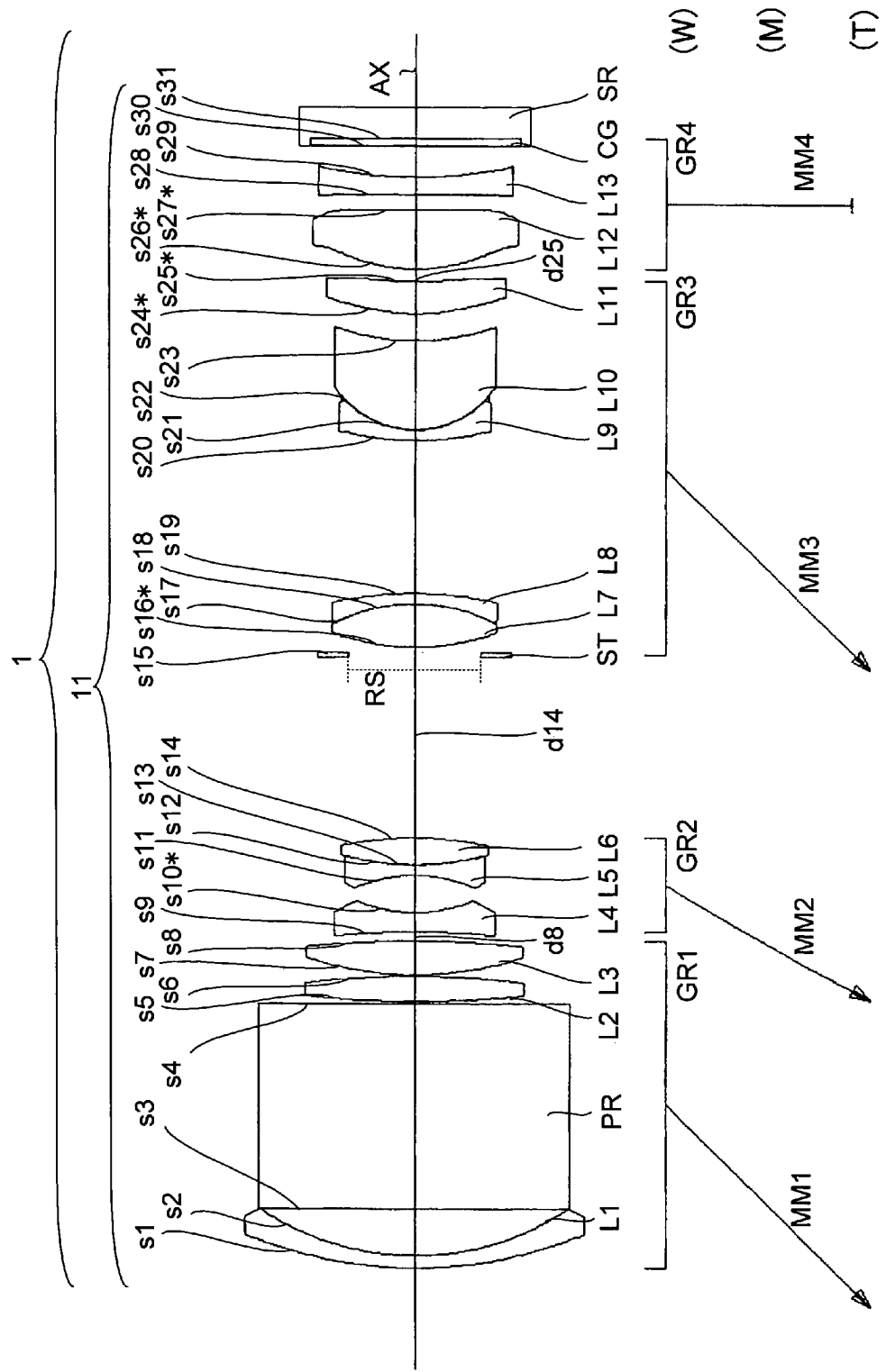
FIG. 19 is a lens construction diagram of an optical unit including a variable magnification optical system of Example 5.

The variable magnification optical system 11 of Example 5 moves toward the object side at least part of the lens units (the first lens unit GR1 to the third lens unit GR3) during zooming as shown in FIG. 19. Thus, in FIG. 19, only an axial space distance (di) that fluctuates following the zooming is numbered. More specifically, d8, d14, and d25 are shown in the figure.

FIGS. 20A to 20C through FIGS. 22A to 22C show aberration occurring in the variable magnification optical system 11 of Example 5 during zooming. These FIGS. 20A to 20C through FIGS. 22A to 22C are expressed in the same manner as FIGS. 2A to 2C through FIGS. 4A to 4C.

[4-5. Variable Magnification Optical System of Example 6 (See FIG. 23)]

[First Lens Unit]

The first lens unit GR1 includes: in order from the object side, a first lens element (most object side lens element) L1, an optical prism PR, a second lens element L2, and a third lens element L3, respectively having the following properties:

| | |
|---|---|
| The first lens element L1 | a negative meniscus lens element convex on the object side; |
| The second lens element L2 | a positive lens element convex on both sides; and |
| The third lens element L3 | a positive meniscus lens element convex on the object side. |

[Second Lens Unit]

The second lens unit GR2 includes: in order from the object side, a fourth lens element L4, a fifth lens element L5, and a sixth lens element L6, respectively having the following properties:

| | |
|---|---|
| The fourth lens element L4 | a negative meniscus lens element convex on the object side (s10 is aspherical); |
| The fifth lens element L5 | a negative lens element concave on both sides; and |
| The sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, and an eleventh lens L11, respectively having the following properties:

| The seventh lens element L7 | a positive lens element convex on both sides (s16 is aspherical); |
|---|---|
| The eighth lens element L8 | a negative meniscus lens element concave on the object side; |
| The ninth lens element L9 | a negative meniscus lens element convex on the object side; |
| The tenth lens element L10 | a positive meniscus lens element convex on the object side; and |
| The eleventh lens element L11 | a positive meniscus lens element convex on the object side (s24 and s25 are aspherical). |

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

| The twelfth lens element L12 | a positive lens element convex on both sides (s26 and s27 are aspherical); and |
|---|---|
| The thirteenth lens element L13 | a negative meniscus lens element concave on the object side |

[Construction Data of Variable Magnification Optical System (Example 6)]

Construction data of the variable magnification optical system 11 of Example 6 is shown in Tables. 11 and 12, which are expressed in the same manner as Tables. 1 and 2 described above.

[Movement of Each Lens Unit in the Optical Unit]

[Zooming]

Figure 23:
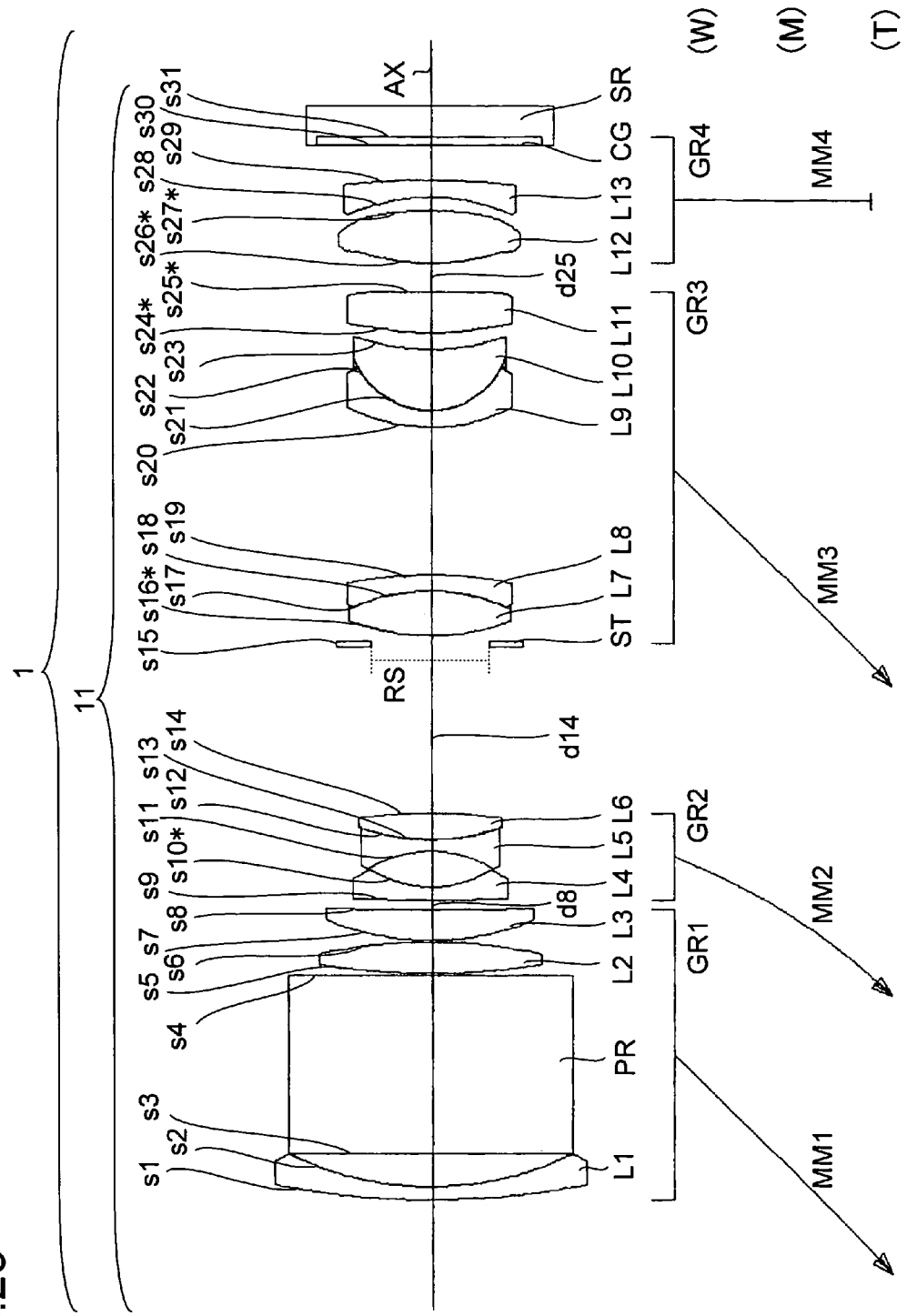
FIG. 23 is a lens construction diagram of an optical unit including a variable magnification optical system of Example 6.

The variable magnification optical system 11 of Example 6 moves toward the object side at least part of the lens units (the first lens unit GR1 to the third lens unit GR3) during zooming as shown in FIG. 23. Thus, in FIG. 23, only an axial space distance (di) that fluctuates following the zooming is numbered. More specifically, d8, d14, and d25 are shown in the figure.

FIGS. 24A to 24C through FIGS. 26A to 26C show aberration occurring in the variable magnification optical system 11 of Example 6 during zooming. These FIGS. 24A to 24C through FIGS. 26A to 26C are expressed in the same manner as FIGS. 2A to 2C through FIGS. 4A to 4C.

[Variable Magnification Optical System of Example 7 (See FIG. 27)]

[First Lens Unit GR1]

The first lens unit GR1 includes: in order from the object side, a first lens element (most object side lens element) L1, an optical prism PR, a second lens element L2, and a third lens element L3, respectively having the following properties:

| The first lens element L1 | a negative meniscus lens element convex on the object side; |
|---|---|
| The second lens element L2 | a positive lens element convex on both sides; and |
| The third lens element L3 | a positive meniscus lens element convex on the object side. |

[Second Lens Unit]

The second lens unit GR2 includes: in order from the object side, a fourth lens element L4, a fifth lens element L5, and a sixth lens element L6, respectively having the following properties:

| The fourth lens element L4 | a negative lens element concave on both sides (s10 is aspherical); |
|---|---|
| The fifth lens element L5 | a negative lens element concave on both sides; and |
| The sixth lens element L6 | a positive lens element convex on both sides. |

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element L7, an eighth lens element L8, a ninth lens element L9, a tenth lens element L10, and an eleventh lens L11, respectively having the following properties:

| The seventh lens element L7 | a positive lens element convex on both sides (s16 is aspherical) |
|---|---|
| The eighth lens element L8 | a negative meniscus lens element concave on the object side; |
| The ninth lens element L9 | a positive lens element convex on both sides; |
| The tenth lens element L10 | a negative lens element concave on both sides; and |
| The eleventh lens element L11 | a negative meniscus lens element concave on the object side (s24 and s25 are aspherical). |

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12 and a cover glass CG (glass formed of two surfaces having s28 and s29), the twelfth lens element L12 having the following property:

| The twelfth lens element L12 | a positive meniscus lens element convex on the object side (s26 and s27 are aspherical). |
|---|---|

[Construction Data of Variable Magnification Optical System (Example 7)]

Construction data of the variable magnification optical system 11 of Example 7 is shown in Tables. 13 and 14, which are expressed in the same manner as Tables. 1 and 2 described above.

[Movement of Each Lens Unit in the Optical Unit]

[Zooming]

Figure 27:
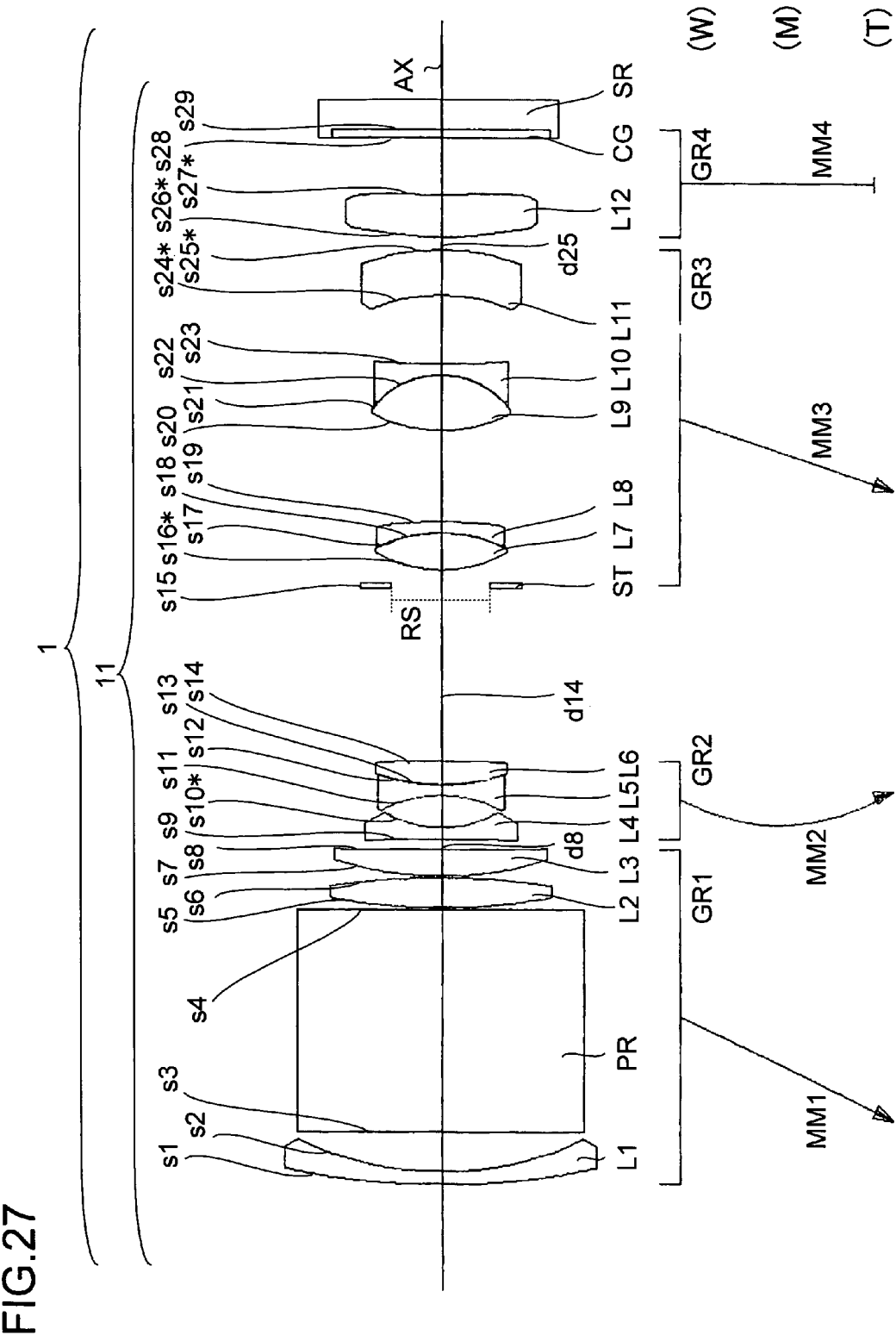
FIG. 27 is a lens construction diagram of an optical unit including a variable magnification optical system of Example 7.

The variable magnification optical system 11 of Example 7 moves toward the object side at least part of the lens units during zooming as shown in FIG. 27. More specifically, the first lens unit GR1 to the third lens unit GR3 move toward the object side (note that the second lens unit GR2 moves backward toward the image side after traveling toward the object side). Thus, in FIG. 27, only an axial space distance (di) that fluctuates following the zooming is numbered. More specifically, d8, d14, and d25 are shown in the figure.

FIGS. 28A to 28C through FIGS. 30A to 30C show aberration occurring in the variable magnification optical system 11 of Example 7 during zooming. These FIGS. 28A to 28C through FIGS. 30A to 30C are expressed in the same manner as FIGS. 2A to 2C through FIGS. 4A to 4C.

Other Embodiment

The invention is not limited to the embodiment described above, and thus various modifications can be made without departing from the sprit of the invention.

For example, the image taking apparatus according to the invention is an optical apparatus that optically takes in a picture image of a photographing subject and outputs it as an electrical signal, and forms a main component of a camera used for still image photographing and moving image photographing of a photographic subject. Examples of such a camera include a video camera, a monitoring camera, an in-vehicle camera, a videophone camera, a door phone camera, and the like. Included also in these examples are cameras that are internally or externally provided in a personal computer, a portable digital appliance (compact, portable digital appliance terminal such as a mobile computer, a cellular phone, a personal digital assistant (PDA), or the like), their peripheral appliances (a mouse, a scanner, a printer, a memory, and the like), other digital appliances, and the like.

As can be understood from these examples, the use of an image taking apparatus permits not only construction of a camera but also additional camera function by loading the image taking apparatus in the various appliances. For example, a digital appliance equipped with image input function, such as a camera-equipped cellular phone or the like can be constructed.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit transmission and reception of images, including both those connected directly to a network and those connected to a network by way of a device, such as a personal computer, having an information processing capability).

The variable magnification optical system 11 is used in various image taking apparatuses (a silver halide photographic camera, a digital still camera, and the like) and digital input appliances (for example, a digital appliance provided with an image taking apparatus). Therefore, an image taking apparatus or the like using the variable magnification optical system 11 is compact. Moreover, the portion of the variable magnification optical system 11 occupying the limited volume inside a housing in an image taking apparatus or the like is relatively small. Thus, inside the housing with sufficient space in the image taking apparatus or the like, various components (electronic components and the like) can be arranged (the effective use of the housing volume can be achieved), thus achieving a high-performance image taking apparatus loaded with various components.

An image taking apparatus 29 as shown in FIGS. 5 and 6 is configured to perform zooming or the like by fixing the image sensor SR while moving the first lens unit GR1 including the optical path changing element (the optical prism PR or reflective mirror) and the third lens unit GR3. Alternatively, the image taking apparatus 29 may be configured to perform zooming or the like by fixing the first lens unit GR1 including the optical path changing element and the third lens unit GR3 while moving the image sensor SR.

[Overview]

The variable magnification optical system described above can also be expressed as follows.

The variable magnification optical system is provided with lens units that focus a ray of light from the object side on an image sensor. The lens unit located at the first position from the object side toward the image side, in particular, includes an optical path changing element for changing the optical path. The variable magnification optical system performs magnification variation by changing gaps between the lens units.

Such a variable magnification optical system satisfies conditional formulae (1) to (3) below:

| | |
|---|---|
| $4 < ft/fw$ | Conditional formula (1), |
| $1.72 < N\_PR$ | Conditional formula (2), |
| $35 < v\_PR$ | Conditional formula (3), | where

| | |
|---|---|
| ft | denotes the focal length of the entire system at the telephoto end; |
| fw | denotes the focal length of the entire system at the wide-angle end; |
| n\_PR | denotes the refractive index of the optical path changing element for a d-line; and |
| v\_PR | denotes the Abbe number of the optical path changing element for the d-line. |

Moreover, it is preferable that the optical path changing element in the variable magnification optical system satisfy conditional formula (4) below:

| | |
|---|---|
| $0.2 < d\_PR/ft < 0.4$ | Conditional formula (4), | where

| | |
|---|---|
| d_PR | denotes the optical path length of the optical path changing element. |

It is preferable that, in addition to the optical path changing element, one lens element having a negative optical power and two lens element having a positive optical power be included in the lens unit at the first position.

It is preferable that a lens element having a negative optical power be included at the most object side in the lens unit at the first position in the variable magnification optical system and satisfy conditional formula (5) below:

| | |
|---|---|
| $-3 < f\_GR1Los/f1 < -1$ | Conditional formula (5), | where

| | |
|---|---|
| f_GR1Los | denotes the focal length of the lens element located at the most object side in the lens unit at the first position, and |
| f1 | denotes the focal length of the lens unit at the first position. |

It is preferable that the lens element having a negative optical power be a negative meniscus lens element convex on the object side.

In the variable magnification optical system, it is preferable that the lens unit at the first position have a positive optical power and that an optical aperture stop for blocking part of a ray of light be located closer to the image than the lens unit at the first position.

It is preferable that the optical aperture stop be located at the most object side of the lens unit located at the third position from the object side toward the image side and that magnification variation be performed by movement of the lens units at the first and third positions and also movement of the lens unit located at the second position from the object side toward the image side.

It is preferable that, in the lens unit at the first position in the variable magnification optical system, at least two lens elements having a positive optical power be located closer to the image than the optical path changing element.

It is preferable that the optical path changing element satisfy conditional formula (4) below:

| | |
|---|---|
| $0.2 < d\_PR/ft < 0.4$ | Conditional formula (4), | where

| | |
|---|---|
| d_PR | denotes the optical path length of the optical path changing element. |

Moreover, it is preferable that magnification variation be performed by movement of the lens unit at the first position and movement of the lens units located at the second and third positions from the object side toward the image side.

According to the variable magnification optical system described above, the optical path changing element is included which has relatively high refractive index and Abbe number. Thus, even with a variable magnification optical system having a high zoom ratio of 4× or above, the air gap between the optical path changing element and the lens unit in front thereof and the air gap between the optical path changing element and the lens unit at the back thereof, both attributable to the refractive index, are not excessively large. In addition, chromatic aberration attributable to the Abbe number is less likely to occur. Therefore, the high-performance variable magnification optical system can, while being compact, suppress chromatic aberration and the like (correction).

An image taking apparatus including a variable magnification optical system as described above is compact and provides high-performance.

The detailed embodiments, examples, and the like described above, just clarify the technical details of the invention. Therefore, the invention should not be narrowly interpreted by being limited to the detailed examples only; thus, various modifications can be made within the range of the appended claims.

TABLE 1

| Example 1 | | Focal Length Position f[mm] FNO | | | (W)~(M)~(T) 7.98~17.55~37.74 3.31~4.13~5.20 | | |
|---|---|---|---|---|---|---|---|
| i | ri[mm] | i | di[mm] | i | Ni | vi | Element |
| 1 | 43.419 | | | | | | |
| | | 1 | 0.800 | 1 | 1.92286 | 20.88 | L1   GR1 |
| 2 | 19.667 | | | | | | |
| | | 2 | 2.150 | | | | |
| 3 | ∞ | | | | | | |
| | | 3 | 12.329 | 2 | 1.88300 | 40.79 | PR |
| 4 | ∞ | | | | | | |
| | | 4 | 0.100 | | | | |
| 5 | 30.532 | | | | | | |
| | | 5 | 2.016 | 3 | 1.58913 | 61.25 | L2 |
| 6 | −40.926 | | | | | | |
| | | 6 | 0.100 | | | | |
| 7 | 16.808 | | | | | | |
| | | 7 | 1.757 | 4 | 1.49700 | 81.61 | L3 |

TABLE 1-continued

| Example 1 | | Focal Length Position f[mm] FNO | | | | (W)~(M)~(T) 7.98~17.55~37.74 3.31~4.13~5.20 | |
|---|---|---|---|---|---|---|---|
| i | ri[mm] | i | di[mm] | i | Ni | vi | Element |
| 8 | 99.776 | | | | | | |
| | | 8 | 0.745~5.910~9.810 | | | | |
| 9 | ~124.542 | | | | | | |
| | | 9 | 0.800 | 5 | 1.77250 | 49.77 | L4  GR2 |
| 10 | 7.058 * | | | | | | |
| | | 10 | 2.378 | | | | |
| 11 | −9.524 | | | | | | |
| | | 11 | 1.038 | 6 | 1.72916 | 54.67 | L5 |
| 12 | 12.650 | | | | | | |
| | | 12 | 0.010 | 7 | 1.51400 | 42.83 | |
| 13 | 12.650 | | | | | | |
| | | 13 | 1.476 | 8 | 1.92286 | 20.88 | L6 |
| 14 | −48.404 | | | | | | |
| | | 14 | 10.048~4.883~0.984 | | | | |
| 15 | ∞ | | | | | | ST  GR3 |
| | | 15 | 0.500 | | | | |
| 16 | 11.975 * | | | | | | |
| | | 16 | 4.379 | 9 | 1.69350 | 53.39 | L7 |
| 17 | −10.341 | | | | | | |
| | | 17 | 0.010 | 10 | 1.51400 | 42.83 | |
| 18 | −10.341 | | | | | | |
| | | 18 | 0.700 | 11 | 1.80518 | 25.46 | L8 |
| 19 | −43.772 | | | | | | |
| | | 19 | 9.841 | | | | |
| 20 | 18.390 | | | | | | |
| | | 20 | 0.700 | 12 | 1.88300 | 40.79 | L9 |
| 21 | 10.262 | | | | | | |
| | | 21 | 0.010 | 13 | 1.51400 | 42.83 | |
| 22 | 10.262 | | | | | | |
| | | 22 | 2.935 | 14 | 1.58144 | 40.89 | L10 |
| 23 | −23.748 | | | | | | |
| | | 23 | 0.903 | | | | |
| 24 | −9.495 | | | | | | |
| | | 24 | 1.271 | 15 | 1.80610 | 33.27 | L11 |
| 25 | −55.610 | | | | | | |
| | | 25 | 0.432 | | | | |
| 26 | 26.936 | | | | | | |
| | | 26 | 2.227 | 16 | 1.49700 | 81.61 | L12 |
| 27 | −19.736 | | | | | | |
| | | 27 | 3.413~14.807~29.913 | | | | |
| 28 | 19.346 * | | | | | | |
| | | 28 | 4.000 | 17 | 1.53048 | 55.72 | L13  GR4 |
| 29 | −16.159 * | | | | | | |
| | | 29 | 0.270 | | | | |
| 30 | −200.000 | | | | | | |
| | | 30 | 0.893 | 18 | 1.84666 | 23.78 | L14 |
| 31 | 18.290 | | | | | | |
| | | 31 | 6.000 | | | | |
| 32 | ∞ | | | | | | |
| | | 32 | 0.500 | 19 | 1.51680 | 64.20 | CG |
| 33 | ∞ | | | | | | |

TABLE 2

| Example 1 | | | |
|---|---|---|---|
| ϵ | 1.0000 | ϵ | 1.0000 |
| Aspherical Surface Data of Surface 10(i = 10) | | Aspherical Surface Data of Surface 28(i = 28) | |
| A4 | −0.10197203 E−03 | A4 | −0.15307901 E−04 |
| A6 | −0.59864948 E−05 | A6 | −0.16093656 E−04 |
| A8 | 0.63239314 E−06 | A8 | 0.50352433 E−06 |
| A10 | −0.22955553 E−07 | A10 | −0.11138404 E−07 |

TABLE 2-continued

| Example 1 | | | |
|---|---|---|---|
| ϵ | 1.0000 | ϵ | 1.0000 |
| Aspherical Surface Data of Surface 16(i = 16) | | Aspherical Surface Data of Surface 29(i = 29) | |
| A4 | −0.90047005 E−04 | A4 | 0.19494141 E−03 |
| A6 | 0.10298751 E−05 | A6 | −0.12810081 E−04 |
| A8 | −0.67772055 E−07 | A8 | 0.18629352 E−06 |
| A10 | 0.20176346 E−08 | A10 | −0.38610777 E−08 |

TABLE 3

| Example 2 | | Focal Length Position f[mm] FNO | | (W)~(M)~(T) 7.83~24.24~44.26 3.32~4.59~5.50 | | | |
|---|---|---|---|---|---|---|---|
| i | ri[mm] | i | di[mm] | i | Ni | vi | Element |
| 1 | 41.341 | | | | | | |
| | | 1 | 0.800 | 1 | 1.92286 | 20.88 | L1  GR1 |
| 2 | 20.309 | | | | | | |
| | | 2 | 2.150 | | | | |
| 3 | ∞ | | | | | | |
| | | 3 | 12.000 | 2 | 1.88300 | 40.79 | PR |
| 4 | ∞ | | | | | | |
| | | 4 | 0.100 | | | | |
| 5 | 32.423 | | | | | | |
| | | 5 | 1.862 | 3 | 1.58913 | 61.25 | L2 |
| 6 | −57.490 | | | | | | |
| | | 6 | 0.100 | | | | |
| 7 | 15.686 | | | | | | |
| | | 7 | 1.857 | 4 | 1.49700 | 81.61 | L3 |
| 8 | 122.827 | | | | | | |
| | | 8 | 0.608~7.691~10.573 | | | | |
| 9 | 105.786 | | | | | | |
| | | 9 | 0.800 | 5 | 1.77250 | 49.77 | L4  GR2 |
| 10 | 6.480 * | | | | | | |
| | | 10 | 2.162 | | | | |
| 11 | −8.696 | | | | | | |
| | | 11 | 0.700 | 6 | 1.72916 | 54.67 | L5 |
| 12 | 12.191 | | | | | | |
| | | 12 | 0.010 | 7 | 1.51400 | 42.83 | |
| 13 | 12.191 | | | | | | |
| | | 13 | 1.481 | 8 | 1.92286 | 20.88 | L6 |
| 14 | −46.939 | | | | | | |
| | | 14 | 10.872~3.789~0.907 | | | | |
| 15 | ∞ | | | | | | ST  GR3 |
| | | 15 | 0.500 | | | | |
| 16 | 11.433 * | | | | | | |
| | | 16 | 3.481 | 9 | 1.69350 | 53.39 | L7 |
| 17 | −10.070 | | | | | | |
| | | 17 | 0.010 | 10 | 1.51400 | 42.83 | |
| 18 | −10.070 | | | | | | |
| | | 18 | 0.700 | 11 | 1.80518 | 25.46 | L8 |
| 19 | −42.498 | | | | | | |
| | | 19 | 9.840 | | | | |
| 20 | 15.469 | | | | | | |
| | | 20 | 0.700 | 12 | 1.88300 | 40.79 | L9 |
| 21 | 8.807 | | | | | | |
| | | 21 | 0.010 | 13 | 1.51400 | 42.83 | |
| 22 | 8.807 | | | | | | |
| | | 22 | 2.839 | 14 | 1.58144 | 40.89 | L10 |
| 23 | −28.176 | | | | | | |
| | | 23 | 0.828 | | | | |
| 24 | −9.309 | | | | | | |
| | | 24 | 0.700 | 15 | 1.80610 | 33.27 | L11 |
| 25 | −45.550 | | | | | | |
| | | 25 | 0.486 | | | | |
| 26 | 20.950 | | | | | | |
| | | 26 | 2.449 | 16 | 1.49700 | 81.61 | L12 |
| 27 | −25.746 | | | | | | |
| | | 27 | 1.839~17.111~28.339 | | | | |
| 28 | 47.082 * | | | | | | |
| | | 28 | 4.000 | 17 | 1.53048 | 55.72 | L13  GR4 |
| 29 | −13.563 * | | | | | | |
| | | 29 | 0.122 | | | | |
| 30 | −200.000 | | | | | | |
| | | 30 | 1.000 | 18 | 1.84666 | 23.78 | L14 |
| 31 | 22.980 | | | | | | |
| | | 31 | 6.000 | | | | |
| 32 | ∞ | | | | | | |
| | | 32 | 0.500 | 19 | 1.51680 | 64.20 | CG |
| 33 | ∞ | | | | | | |

TABLE 4

Example 2

| ϵ | 1.0000 | ϵ | 1.0000 |
|---|---|---|---|
| Aspherical Surface Data of Surface 10(i = 10) | | Aspherical Surface Data of Surface 28(i = 28) | |
| A4 | −0.99302225 E−04 | A4 | −0.87972213 E−04 |
| A6 | −0.70030523 E−05 | A6 | −0.18945029 E−04 |
| A8 | 0.67791112 E−06 | A8 | 0.64601763 E−06 |
| A10 | −0.22461986 E−07 | A10 | −0.15667561 E−07 |

TABLE 4-continued

Example 2

| ϵ | 1.0000 | ϵ | 1.0000 |
|---|---|---|---|
| Aspherical Surface Data of Surface 16(i = 16) | | Aspherical Surface Data of Surface 29(i = 29) | |
| A4 | −0.94093498 E−04 | A4 | 0.21761696 E−03 |
| A6 | 0.90824359 E−06 | A6 | −0.16245656 E−04 |
| A8 | −0.75884840 E−07 | A8 | 0.30350491 E−06 |
| A10 | 0.25367720 E−08 | A10 | −0.57410322 E−08 |

TABLE 5

Example 3

Focal Length Position f[mm] FNO: (W)~(M)~(T) 7.99~19.17~45.16 3.35~4.42~5.93

| i | ri[mm] | i | di[mm] | i | Ni | vi | Element | |
|---|---|---|---|---|---|---|---|---|
| 1 | 44.704 | | | | | | | |
| | | 1 | 0.800 | 1 | 1.92286 | 20.88 | L1 | GR1 |
| 2 | 21.386 | | | | | | | |
| | | 2 | 2.450 | | | | | |
| 3 | ∞ | | | | | | | |
| | | 3 | 11.400 | 2 | 1.88300 | 40.79 | PR | |
| 4 | ∞ | | | | | | | |
| | | 4 | 0.195 | | | | | |
| 5 | 36.489 | | | | | | | |
| | | 5 | 1.918 | 3 | 1.58913 | 61.25 | L2 | |
| 6 | −44.135 | | | | | | | |
| | | 6 | 0.129 | | | | | |
| 7 | 18.219 | | | | | | | |
| | | 7 | 1.757 | 4 | 1.49700 | 81.61 | L3 | |
| 8 | 214.691 | | | | | | | |
| | | 8 | 0.801~6.709~11.275 | | | | | |
| 9 | −48.164 | | | | | | | |
| | | 9 | 0.800 | 5 | 1.77250 | 49.77 | L4 | GR2 |
| 10 | 7.688 * | | | | | | | |
| | | 10 | 3.181 | | | | | |
| 11 | −10.526 | | | | | | | |
| | | 11 | 0.700 | 6 | 1.72916 | 54.67 | L5 | |
| 12 | 15.314 | | | | | | | |
| | | 12 | 0.010 | 7 | 1.51400 | 42.83 | | |
| 13 | 15.314 | | | | | | | |
| | | 13 | 1.471 | 8 | 1.92286 | 20.88 | L6 | |
| 14 | −33.140 | | | | | | | |
| | | 14 | 11.424~5.516~0.950 | | | | | |
| 15 | ∞ | | | | | | ST | GR3 |
| | | 15 | 1.000 | | | | | |
| 16 | 14.709 | | | | | | | |
| | | 16 | 3.157 | 9 | 1.69350 | 53.39 | L7 | |
| 17 | −11.220 | | | | | | | |
| | | 17 | 0.010 | 10 | 1.51400 | 42.83 | | |
| 18 | −11.220 | | | | | | | |
| | | 18 | 2.948 | 11 | 1.80518 | 25.46 | L8 | |
| 19 | −21.569 | | | | | | | |
| | | 19 | 10.200 | | | | | |
| 20 | 16.714 | | | | | | | |
| | | 20 | 0.700 | 12 | 1.80518 | 25.46 | L9 | |
| 21 | 5.882 | | | | | | | |
| | | 21 | 0.010 | 13 | 1.51400 | 42.83 | | |
| 22 | 5.882 | | | | | | | |
| | | 22 | 2.854 | 14 | 1.48749 | 70.44 | L10 | |
| 23 | 36.212 | | | | | | | |
| | | 23 | 3.282 | | | | | |
| 24 | 20.118 * | | | | | | | |
| | | 24 | 2.054 | 15 | 1.60700 | 27.00 | L11 | |
| 25 | 37.298 * | | | | | | | |
| | | 25 | 0.800~11.677~25.629 | | | | | |

TABLE 5-continued

| Example 3 | Focal Length Position f[mm] FNO | | | | (W)~(M)~(T) 7.99~19.17~45.16 3.35~4.42~5.93 | | |
|---|---|---|---|---|---|---|---|
| i | ri[mm] | i | di[mm] | i | Ni | vi | Element |
| 26 | 22.688 * | | | | | | |
| | | 26 | 6.000 | 16 | 1.53048 | 55.72 | L12  GR4 |
| 27 | ∞ * | | | | | | |
| | | 27 | 3.797 | | | | |
| 28 | ∞ | | | | | | |
| | | 28 | 0.500 | 17 | 1.51680 | 64.20 | CG |
| 29 | ∞ | | | | | | |

TABLE 6

| Example 3 | | | |
|---|---|---|---|
| ε | 1.0000 | ε | 1.0000 |
| Aspherical Surface Data of Surface 10(i = 10) | | Aspherical Surface Data of Surface 25(i = 25) | |
| A4 | −0.15663490 E−03 | A4 | −0.41777597 E−03 |
| A6 | −0.17225086 E−05 | A6 | −0.19349262 E−05 |
| A8 | 0.13760168 E−07 | A8 | 0.15808145 E−06 |
| A10 | −0.19099660 E−08 | A10 | −0.91796432 E−09 |
| Aspherical Surface Data of Surface 16(i = 16) | | Aspherical Surface Data of Surface 26(i = 26) | |
| A4 | −0.10403172 E−03 | A4 | −0.85892111 E−04 |
| A6 | 0.29726559 E−06 | A6 | 0.42881465 E−05 |

TABLE 6-continued

| Example 3 | | | |
|---|---|---|---|
| ε | 1.0000 | ε | 1.0000 |
| A8 | −0.15823879 E−07 | A8 | −0.38774715 E−06 |
| A10 | 0.39989178 E−09 | A10 | 0.57234103 E−08 |
| Aspherical Surface Data of Surface 24(i = 24) | | Aspherical Surface Data of Surface 27(i = 27) | |
| A4 | −0.27390750 E−03 | A4 | 0.75585543 E−04 |
| A6 | −0.15628240 E−05 | A6 | 0.13968653 E−04 |
| A8 | 0.19691831 E−06 | A8 | −0.12010832 E−05 |
| A10 | −0.74042374 E−09 | A10 | 0.19260161 E−07 |

TABLE 7

| Example 4 | Focal Length Position f[mm] FNO | | | | (W)~(M)~(T) 7.99~24.73~52.67 3.19~4.69~5.78 | | |
|---|---|---|---|---|---|---|---|
| i | ri[mm] | i | di[mm] | i | Ni | vi | Element |
| 1 | 39.700 | | | | | | |
| | | 1 | 0.800 | 1 | 1.92286 | 20.88 | L1  GR1 |
| 2 | 20.903 | | | | | | |
| | | 2 | 2.150 | | | | |
| 3 | ∞ | | | | | | |
| | | 3 | 12.000 | 2 | 1.88300 | 40.79 | PR |
| 4 | ∞ | | | | | | |
| | | 4 | 0.149 | | | | |
| 5 | 44.432 | | | | | | |
| | | 5 | 1.768 | 3 | 1.58913 | 61.25 | L2 |
| 6 | −45.713 | | | | | | |
| | | 6 | 0.100 | | | | |
| 7 | 17.910 | | | | | | |
| | | 7 | 1.839 | 4 | 1.49700 | 81.61 | L3 |
| 8 | −2118.420 | | | | | | |
| | | 8 | 0.697~7.698~11.717 | | | | |
| 9 | −73.605 | | | | | | |
| | | 9 | 0.800 | 6 | 1.77250 | 49.77 | L4  GR2 |
| 10 | 7.922 * | | | | | | |
| | | 10 | 2.473 | | | | |
| 11 | −10.526 | | | | | | |
| | | 11 | 0.700 | 6 | 1.72916 | 54.67 | L5 |
| 12 | 13.422 | | | | | | |
| | | 12 | 0.010 | 7 | 1.51400 | 42.83 | |
| 13 | 13.422 | | | | | | |
| | | 13 | 1.496 | 8 | 1.92286 | 20.88 | L6 |
| 14 | −47.090 | | | | | | |
| | | 14 | 11.820~4.819~0.800 | | | | |
| 15 | ∞ | | | | | | ST  GR3 |
| | | 15 | 0.500 | | | | |
| 16 | 13.501 * | | | | | | |
| | | 16 | 3.007 | 9 | 1.69350 | 53.39 | L7 |

TABLE 7-continued

| Example 4 | | Focal Length Position f[mm] FNO | | | (W)~(M)~(T) 7.99~24.73~52.67 3.19~4.69~5.78 | | |
|---|---|---|---|---|---|---|---|
| i | ri[mm] | i | di[mm] | i | Ni | vi | Element |
| 17 | −11.543 | | | | | | |
| | | 17 | 0.010 | 10 | 1.51400 | 42.83 | |
| 18 | −11.543 | | | | | | |
| | | 18 | 1.205 | 11 | 1.80518 | 25.46 | L8 |
| 19 | −24.338 | | | | | | |
| | | 19 | 9.311 | | | | |
| 20 | 13.513 | | | | | | |
| | | 20 | 0.700 | 12 | 1.80518 | 25.46 | L9 |
| 21 | 6.079 | | | | | | |
| | | 21 | 0.010 | 13 | 1.51400 | 42.83 | |
| 22 | 6.079 | | | | | | |
| | | 22 | 2.618 | 14 | 1.48749 | 70.44 | L10 |
| 23 | 21.534 | | | | | | |
| | | 23 | 4.284 | | | | |
| 24 | 60.095 | * | | | | | |
| | | 24 | 3.000 | 15 | 1.60700 | 27.00 | L11 |
| 25 | −1816.893 | * | | | | | |
| | | 25 | 0.800~16.148~27.300 | | | | |
| 26 | 13.759 | * | | | | | |
| | | 26 | 5.034 | 16 | 1.53048 | 55.72 | L12 GR4 |
| 27 | −88.521 | * | | | | | |
| | | 27 | 1.000 | | | | |
| 28 | −200.000 | | | | | | |
| | | 28 | 1.206 | 17 | 1.84666 | 23.78 | L13 |
| 29 | 44.381 | | | | | | |
| | | 29 | 1.502 | | | | |
| 30 | ∞ | | | | | | |
| | | 30 | 0.500 | 18 | 1.51680 | 64.20 | CG |
| 31 | ∞ | | | | | | |

TABLE 8

| Example 4 | | | |
|---|---|---|---|
| ϵ | 1.0000 | ϵ | 1.0000 |
| Aspherical Surface Data of Surface 10(i = 10) | | Aspherical Surface Data of Surface 25(i = 25) | |
| A4 | −0.10347630 E−03 | A4 | −0.52970460 E−03 |
| A6 | 0.10571704 E−07 | A6 | 0.17563218 E−06 |
| A8 | −0.10147936 E−06 | A8 | −0.61275210 E−07 |
| A10 | 0.40490268 E−08 | A10 | 0.86383888 E−09 |
| Aspherical Surface Data of Surface 16(i = 16) | | Aspherical Surface Data of Surface 26(i = 26) | |
| A4 | −0.10745558 E−03 | A4 | 0.82635382 E−04 |
| A6 | 0.94049800 E−07 | A6 | −0.37172310 E−05 |

TABLE 8-continued

| Example 4 | | | |
|---|---|---|---|
| ϵ | 1.0000 | ϵ | 1.0000 |
| A8 | −0.72034064 E−08 | A8 | −0.29629917 E−07 |
| A10 | 0.24899348 E−09 | A10 | −0.19532084 E−08 |
| Aspherical Surface Data of Surface 24(i = 24) | | Aspherical Surface Data of Surface 27(i = 27) | |
| A4 | −0.48200103 E−03 | A4 | 0.46636778 E−03 |
| A6 | 0.23899796 E−06 | A6 | 0.33804543 E−05 |
| A8 | −0.14206418 E−06 | A8 | −0.10852266 E−05 |
| A10 | 0.27280903 E−08 | A10 | 0.15300655 E−07 |

TABLE 9

| Example 5 | | Focal Length Position f[mm] FNO | | | (W)~(M)~(T) 8.10~25.10~53.45 2.71~4.11~5.15 | | |
|---|---|---|---|---|---|---|---|
| i | ri[mm] | i | di[mm] | i | Ni | vi | Element |
| 1 | 28.794 | | | | | | |
| | | 1 | 0.800 | 1 | 1.92286 | 20.88 | L1 GR1 |
| 2 | 17.862 | | | | | | |
| | | 2 | 3.024 | | | | |
| 3 | ∞ | | | | | | |
| | | 3 | 13.400 | 2 | 1.72916 | 54.67 | PR |
| 4 | ∞ | | | | | | |
| | | 4 | 0.200 | | | | |
| 5 | 66.289 | | | | | | |
| | | 5 | 1.652 | 3 | 1.62041 | 60.34 | L2 |

TABLE 9-continued

| Example 5 | Focal Length Position f[mm] FNO | | | | (W)~(M)~(T) 8.10~25.10~53.45 2.71~4.11~5.15 | | |
|---|---|---|---|---|---|---|---|
| i | ri[mm] | i | di[mm] | i | Ni | vi | Element |
| 6 | −56.704 | | | | | | |
| | | 6 | 0.100 | | | | |
| 7 | 21.375 | | | | | | |
| | | 7 | 2.221 | 4 | 1.49700 | 81.61 | L3 |
| 8 | −65.593 | | | | | | |
| | | 8 | 0.600~7.765~11.935 | | | | |
| 9 | −52.828 | | | | | | |
| | | 9 | 1.281 | 5 | 1.77250 | 49.77 | L4 GR2 |
| 10 | 9.133 * | | | | | | |
| | | 10 | 2.444 | | | | |
| 11 | −9.616 | | | | | | |
| | | 11 | 0.700 | 6 | 1.83481 | 42.72 | L5 |
| 12 | 16.877 | | | | | | |
| | | 12 | 0.010 | 7 | 1.51400 | 42.83 | |
| 13 | 16.877 | | | | | | |
| | | 13 | 1.790 | 8 | 1.92286 | 20.88 | L6 |
| 14 | −21.804 | | | | | | |
| | | 14 | 12.135~4.970~0.800 | | | | |
| 15 | ∞ | | | | | | ST GR3 |
| | | 15 | 0.500 | | | | |
| 16 | 13.775 * | | | | | | |
| | | 16 | 2.868 | 9 | 1.69350 | 53.39 | L7 |
| 17 | −11.093 | | | | | | |
| | | 17 | 0.010 | 10 | 1.51400 | 42.83 | |
| 18 | −11.093 | | | | | | |
| | | 18 | 0.700 | 11 | 1.80518 | 25.46 | L8 |
| 19 | −22.342 | | | | | | |
| | | 19 | 10.082 | | | | |
| 20 | 19.314 | | | | | | |
| | | 20 | 0.700 | 12 | 1.80518 | 25.46 | L9 |
| 21 | 6.173 | | | | | | |
| | | 21 | 0.010 | 13 | 1.51400 | 42.83 | |
| 22 | 6.173 | | | | | | |
| | | 22 | 5.801 | 14 | 1.48749 | 70.44 | L10 |
| 23 | 15.109 | | | | | | |
| | | 23 | 1.734 | | | | |
| 24 | 12.411 * | | | | | | |
| | | 24 | 2.092 | 15 | 1.60700 | 27.00 | L11 |
| 25 | 26.761 * | | | | | | |
| | | 25 | 0.800~15.919~27.300 | | | | |
| 26 | 12.442 * | | | | | | |
| | | 26 | 3.808 | 16 | 1.53048 | 55.72 | L12 GR4 |
| 27 | −43.564 * | | | | | | |
| | | 27 | 0.999 | | | | |
| 28 | −200.000 | | | | | | |
| | | 28 | 1.090 | 17 | 1.84666 | 23.78 | L13 |
| 29 | 29.288 | | | | | | |
| | | 29 | 1.955 | | | | |
| 30 | ∞ | | | | | | |
| | | 30 | 0.500 | 18 | 1.51680 | 64.20 | CG |
| 31 | ∞ | | | | | | |

TABLE 10

| Example 5 | | | |
|---|---|---|---|
| ϵ | 1.0000 | ϵ | 1.0000 |
| Aspherical Surface Data of Surface 10(i = 10) | | Aspherical Surface Data of Surface 25(i = 25) | |
| A4 | −0.11251572 E−03 | A4 | −0.38660182 E−03 |
| A6 | 0.81065978 E−06 | A6 | −0.81368352 E−05 |
| A8 | −0.20573522 E−06 | A8 | 0.28754443 E−06 |
| A10 | 0.89121016 E−08 | A10 | −0.23391449 E−08 |

TABLE 10-continued

| Example 5 | | | |
|---|---|---|---|
| ϵ | 1.0000 | ϵ | 1.0000 |
| Aspherical Surface Data of Surface 16(i = 16) | | Aspherical Surface Data of Surface 26(i = 26) | |
| A4 | −0.11389588 E−03 | A4 | 0.36504125 E−03 |
| A6 | 0.30155805 E−06 | A6 | −0.74333710 E−05 |
| A8 | −0.16602730 E−07 | A8 | −0.41127534 E−07 |
| A10 | 0.33990965 E−09 | A10 | −0.34151284 E−08 |

TABLE 10-continued

Example 5

| ϵ | 1.0000 | ϵ | 1.0000 |
|---|---|---|---|
| Aspherical Surface Data of Surface 24(i = 24) | | Aspherical Surface Data of Surface 27(i = 27) | |
| A4 | −0.32855269 E−03 | A4 | 0.98907401 E−03 |
| A6 | −0.61225955 E−05 | A6 | −0.70237988 E−05 |

TABLE 10-continued

Example 5

| ϵ | 1.0000 | ϵ | 1.0000 |
|---|---|---|---|
| A8 | 0.20169935 E−06 | A8 | −0.12081571 E−05 |
| A10 | −0.32385413 E−09 | A10 | 0.18264023 E−07 |

TABLE 11

| Example 6 | | Focal Length Position f[mm] FNO | | (W)~(M)~(T) 6.30~19.52~41.57 2.66~3.90~5.15 | | | |
|---|---|---|---|---|---|---|---|
| i | ri[mm] | i | di[mm] | i | Ni | νi | Element |
| 1 | 48.110 | | | | | | |
| | | 1 | 0.800 | 1 | 1.92286 | 20.88 | L1 GR1 |
| 2 | 19.270 | | | | | | |
| | | 2 | 2.000 | | | | |
| 3 | ∞ | | | | | | |
| | | 3 | 10.800 | 2 | 1.88300 | 40.79 | PR |
| 4 | ∞ | | | | | | |
| | | 4 | 0.127 | | | | |
| 5 | 40.997 | | | | | | |
| | | 5 | 1.901 | 3 | 1.58913 | 61.25 | L2 |
| 6 | −30.751 | | | | | | |
| | | 6 | 0.100 | | | | |
| 7 | 15.739 | | | | | | |
| | | 7 | 1.871 | 4 | 1.49700 | 81.61 | L3 |
| 8 | 170.924 | | | | | | |
| | | 8 | 0.600~6.966~10.150 | | | | |
| 9 | 140.361 | | | | | | |
| | | 9 | 0.800 | 5 | 1.77250 | 49.77 | L4 GR2 |
| 10 | 6.442 * | | | | | | |
| | | 10 | 2.185 | | | | |
| 11 | −7.197 | | | | | | |
| | | 11 | 0.700 | 6 | 1.72916 | 54.67 | L5 |
| 12 | 12.245 | | | | | | |
| | | 12 | 0.010 | 7 | 1.51400 | 42.83 | |
| 13 | 12.245 | | | | | | |
| | | 13 | 1.641 | 8 | 1.92286 | 20.88 | L6 |
| 14 | −30.167 | | | | | | |
| | | 14 | 10.377~4.012~0.827 | | | | |
| 15 | ∞ | | | | | | ST GR3 |
| | | 15 | 0.500 | | | | |
| 16 | 12.223 * | | | | | | |
| | | 16 | 2.758 | 9 | 1.69350 | 53.39 | L7 |
| 17 | −10.946 | | | | | | |
| | | 17 | 0.010 | 10 | 1.51400 | 42.83 | |
| 18 | −10.946 | | | | | | |
| | | 18 | 0.988 | 11 | 1.80518 | 25.46 | L8 |
| 19 | −24.189 | | | | | | |
| | | 19 | 9.009 | | | | |
| 20 | 10.533 | | | | | | |
| | | 20 | 1.000 | 12 | 1.80518 | 25.46 | L9 |
| 21 | 4.830 | | | | | | |
| | | 21 | 0.010 | 13 | 1.51400 | 42.83 | |
| 22 | 4.830 | | | | | | |
| | | 22 | 3.677 | 14 | 1.48749 | 70.44 | L10 |
| 23 | 13.721 | | | | | | |
| | | 23 | 1.000 | | | | |
| 24 | 15.633 * | | | | | | |
| | | 24 | 2.433 | 15 | 1.60700 | 27.00 | L11 |
| 25 | 57.853 * | | | | | | |
| | | 25 | 1.704~14.872~28.205 | | | | |
| 26 | 13.095 * | | | | | | |
| | | 26 | 3.158 | 16 | 1.53048 | 55.72 | L12 GR4 |

TABLE 11-continued

| Example 6 | Focal Length Position f[mm] FNO | | | (W)~(M)~(T) 6.30~19.52~41.57 2.66~3.90~5.15 | | |
|---|---|---|---|---|---|---|
| i | ri[mm] | i | di[mm] | i | Ni | vi | Element |
| 27 | −16.163 * | | | | | | |
| | | 27 | 0.781 | | | | |
| 28 | −11.990 | | | | | | |
| | | 28 | 1.000 | 17 | 1.84666 | 23.78 | L13 |
| 29 | −45.718 | | | | | | |
| | | 29 | 2.052 | | | | |
| 30 | ∞ | | | | | | |
| | | 30 | 0.500 | 18 | 1.51680 | 64.20 | CG |
| 31 | ∞ | | | | | | |

TABLE 12

Example 6

| ϵ | 1.0000 | ϵ | 1.0000 |
|---|---|---|---|
| Aspherical Surface Data of Surface 10(i = 10) | | Aspherical Surface Data of Surface 25(i = 25) | |
| A4 | −0.10732497 E−03 | A4 | −0.56438517 E−03 |
| A6 | 0.57313839 E−06 | A6 | −0.13991709 E−04 |
| A8 | −0.42087595 E−06 | A8 | 0.48071072 E−06 |
| A10 | 0.36617830 E−07 | A10 | −0.10628856 E−07 |
| Aspherical Surface Data of Surface 16(i = 16) | | Aspherical Surface Data of Surface 26(i = 26) | |
| A4 | −0.14050118 E−03 | A4 | 0.94933667 E−04 |
| A6 | 0.15126826 E−06 | A6 | −0.20612676 E−05 |

TABLE 12-continued

Example 6

| ϵ | 1.0000 | ϵ | 1.0000 |
|---|---|---|---|
| A8 | −0.17592819 E−07 | A8 | −0.36313239 E−06 |
| A10 | 0.61027539 E−09 | A10 | −0.18922759 E−07 |
| Aspherical Surface Data of Surface 24(i = 24) | | Aspherical Surface Data of Surface 27(i = 27) | |
| A4 | −0.39055016 E−03 | A4 | 0.18297925 E−03 |
| A6 | −0.83755556 E−05 | A6 | 0.19313027 E−04 |
| A8 | 0.34012017 E−06 | A8 | −0.34461882 E−05 |
| A10 | 0.10816659 E−08 | A10 | 0.67376749 E−07 |

TABLE 13

| Example 7 | Focal Length Position f[mm] FNO | | | (W)~(M)~(T) 7.99~19.17~45.16 3.77~5.09~5.20 | | | |
|---|---|---|---|---|---|---|---|
| i | ri[mm] | i | di[mm] | i | Ni | vi | Element |
| 1 | 47.775 | | | | | | |
| | | 1 | 0.800 | 1 | 1.92286 | 20.88 | L1 GR1 |
| 2 | 20.558 | | | | | | |
| | | 2 | 2.450 | | | | |
| 3 | ∞ | | | | | | |
| | | 3 | 14.000 | 2 | 1.88300 | 40.79 | PR |
| 4 | ∞ | | | | | | |
| | | 4 | 0.100 | | | | |
| 5 | 36.725 | | | | | | |
| | | 5 | 1.908 | 3 | 1.63854 | 55.45 | L2 |
| 6 | −42.803 | | | | | | |
| | | 6 | 0.100 | | | | |
| 7 | 21.430 | | | | | | |
| | | 7 | 1.657 | 4 | 1.49700 | 81.61 | L3 |
| 8 | 286.719 | | | | | | |
| | | 8 | 0.649~7.285~14.915 | | | | |
| 9 | −382.266 | | | | | | |
| | | 9 | 0.800 | 5 | 1.77250 | 49.77 | L4 GR2 |
| 10 | 7.035 * | | | | | | |
| | | 10 | 2.004 | | | | |
| 11 | −7.645 | | | | | | |
| | | 11 | 0.700 | 6 | 1.51680 | 64.20 | L5 |
| 12 | 12.557 | | | | | | |
| | | 12 | 0.010 | 7 | 1.51400 | 42.83 | |
| 13 | 12.557 | | | | | | |
| | | 13 | 1.502 | 8 | 1.84666 | 23.78 | L6 |
| 14 | −59.208 | | | | | | |
| | | 14 | 11.167~6.009~0.950 | | | | |
| 15 | ∞ | | | | | | ST GR3 |
| | | 15 | 1.000 | | | | |

TABLE 13-continued

| Example 7 | Focal Length Position f[mm] FNO | | | | (W)~(M)~(T) 7.99~19.17~45.16 3.77~5.09~5.20 | | |
|---|---|---|---|---|---|---|---|
| i | ri[mm] | i | di[mm] | i | Ni | vi | Element |
| 16 | 7.807 * | | | | | | |
| | | 16 | 2.332 | 9 | 1.58913 | 61.25 | L7 |
| 17 | −8.642 | | | | | | |
| | | 17 | 0.010 | 10 | 1.51400 | 42.83 | |
| 18 | −8.642 | | | | | | |
| | | 18 | 0.700 | 11 | 1.83500 | 42.98 | L8 |
| 19 | −24.972 | | | | | | |
| | | 19 | 5.765 | | | | |
| 20 | 9.133 | | | | | | |
| | | 20 | 3.437 | 12 | 1.48749 | 70.44 | L9 |
| 21 | −5.326 | | | | | | |
| | | 21 | 0.010 | 13 | 1.51400 | 42.83 | |
| 22 | −5.326 | | | | | | |
| | | 22 | 0.700 | 14 | 1.80610 | 33.27 | L10 |
| 23 | 54.405 | | | | | | |
| | | 23 | 4.240 | | | | |
| 24 | −15.211 * | | | | | | |
| | | 24 | 2.803 | 15 | 1.60700 | 27.00 | L11 |
| 25 | −18.730 * | | | | | | |
| | | 25 | 0.800~9.075~9.769 | | | | |
| 26 | 19.006 * | | | | | | |
| | | 26 | 2.650 | 16 | 1.53048 | 55.72 | L12 GR4 |
| 27 | 467.395 * | | | | | | |
| | | 27 | 3.471 | | | | |
| 28 | ∞ | | | | | | |
| | | 28 | 0.500 | 17 | 1.51680 | 64.20 | CG |
| 29 | ∞ | | | | | | |

TABLE 14

Example 7

| ϵ | 1.0000 | ϵ | 1.0000 |
|---|---|---|---|
| Aspherical Surface Data of Surface 10(i = 10) | | Aspherical Surface Data of Surface 25(i = 25) | |
| A4 | −0.67799158 E−04 | A4 | −0.97032523 E−03 |
| A6 | 0.96058817 E−06 | A6 | 0.16497548 E−04 |
| A8 | 0.41344081 E−07 | A8 | 0.34413689 E−07 |
| A10 | −0.46262692 E−08 | A10 | 0.17182245 E−07 |
| Aspherical Surface Data of Surface 16(i = 16) | | Aspherical Surface Data of Surface 26(i = 26) | |
| A4 | −0.12912082 E−03 | A4 | −0.37757354 E−04 |
| A6 | 0.91847279 E−06 | A6 | 0.89018556 E−05 |
| A8 | −0.72780971 E−07 | A8 | −0.19277655 E−05 |
| A10 | 0.30673980 E−08 | A10 | 0.47192370 E−07 |
| Aspherical Surface Data of Surface 24(i = 24) | | Aspherical Surface Data of Surface 27(i = 27) | |
| A4 | −0.13966519 E−02 | A4 | 0.29913138 E−03 |
| A6 | 0.13278370 E−04 | A6 | 0.10639857 E−04 |
| A8 | 0.12272916 E−05 | A8 | −0.27271667 E−05 |
| A10 | 0.21670247 E−07 | A10 | 0.62761401 E−07 |

TABLE 15

| | Conditional formulae (1) ft/fw | Conditional formulae (2) n_PR | Conditional formulae (3) v_PR | Conditional formulae (4) d_PR/ft | Conditional formulae (5) f_GR1Los/f1 |
|---|---|---|---|---|---|
| Example 1 | 4.73 | 1.88300 | 40.79 | 0.33 | −1.81 |
| Example 2 | 5.65 | 1.88300 | 40.79 | 0.27 | −1.94 |
| Example 3 | 5.65 | 1.88300 | 40.79 | 0.25 | −1.92 |
| Example 4 | 6.59 | 1.88300 | 40.79 | 0.23 | −2.10 |
| Example 5 | 6.60 | 1.72916 | 54.67 | 0.25 | −2.22 |
| Example 6 | 6.60 | 1.88300 | 40.79 | 0.26 | −1.69 |
| Example 7 | 5.65 | 1.88300 | 40.79 | 0.31 | −1.66 |

What is claimed is:

1. A variable magnification optical system comprising lens units that focus a ray of light from an object side on an image sensor, wherein the lens unit located at a first position from the object side toward the image side includes an optical path changing element for changing an optical path,
wherein magnification variation is performed by changing gaps between the lens units, and
wherein conditional formulae (1) to (3) below are satisfied:

| $4 < ft/fw$ | Conditional formula (1), |
| $1.72 < n\_PR$ | Conditional formula (2), |
| $35 < v\_PR$ | Conditional formula (3), | where

| | |
|---|---|
| ft | denotes a focal length of the entire system at a telephoto end, |
| fw | denotes a focal length of the entire system at a wide-angle end, |
| n__PR | denotes a refractive index of the optical path changing element for a d-line, | and

| | |
|---|---|
| v__PR | denotes an Abbe number of the optical path changing element for the d-line, | wherein the optical path changing element satisfies conditional formula (4) below:

$$0.2 < d\_PR/ft < 0.4 \quad \text{Conditional formula (4),}$$

where

| | |
|---|---|
| d__PR | denotes an optical path length of the optical path changing element, | wherein the lens unit at the first position includes, in addition to the optical path changing element, one lens element having a negative optical power and two lens elements having a positive optical power.

2. A variable magnification optical system
comprising lens units that focus a ray of light from an object side on an image sensor, wherein the lens unit located at a first position from the object side toward the image side includes an optical path changing element for changing an optical path,
wherein magnification variation is performed by changing gaps between the lens units, and
wherein conditional formulae (1) to (3) below are satisfied:

$$4 < ft/fw \quad \text{Conditional formula (1),}$$
$$1.72 < n\_PR \quad \text{Conditional formula (2),}$$
$$35 < v\_PR \quad \text{Conditional formula (3),}$$

where

| | |
|---|---|
| ft | denotes a focal length of the entire system at a telephoto end, |
| fw | denotes a focal length of the entire system at a wide-angle end, |
| n__PR | denotes a refractive index of the optical path changing element for a d-line, | and

| | |
|---|---|
| v__PR | denotes an Abbe number of the optical path changing element for the d-line, | wherein the lens unit at the first position has a positive optical power,
wherein an optical aperture stop for blocking part of the ray of light is located closer to an image than the lens unit at the first position,
wherein the optical aperture stop is located at a most object side of the lens unit located at a third position from the object side toward the image side, and
wherein magnification variation is performed by movement of the lens units at the first and third positions and movement of the lens unit located at a second position from the object side toward the image side.

3. A variable magnification optical system
comprising lens units that focus a ray of light from an object side on an image sensor, wherein the lens unit located at a first position from the object side toward the image side includes an optical path changing element for changing a optical path,
wherein magnification variation is performed by changing gaps between the lens units, and
wherein conditional formulae (1) to (3) below are satisfied:

$$4 < ft/fw \quad \text{Conditional formula (1),}$$
$$1.72 < n\_PR \quad \text{Conditional formula (2),}$$
$$35 < v\_PR \quad \text{Conditional formula (3),}$$

where

| | |
|---|---|
| ft | denotes a focal length of the entire system at a telephoto end, |
| fw | denotes a focal length of the entire system at a wide-angle end, |
| n__PR | denotes a refractive index of the optical path changing element for a d-line, | and

| | |
|---|---|
| v__PR | denotes an Abbe number of the optical path changing element for the d-line, | wherein, in the lens unit at the first position, at least two lens elements having a positive optical power are located closer to the image than the optical path changing element.

4. The variable magnification optical system of claim 3,
wherein the optical path changing element satisfies the conditional formula (4) below:

$$0.2 < d\_PR/ft < 0.4 \quad \text{Conditional formula (4),}$$

where

| | |
|---|---|
| d__PR | denotes an optical path length of the optical path changing element. |

5. A variable magnification optical system
comprising lens units that focus a ray of light from an object side on an image sensor, wherein the lens unit located at a first position from the object side toward the image side includes an optical path changing element for changing a optical path,
wherein magnification variation is performed by changing gaps between the lens units, and wherein conditional formulae (1) to (3) below are satisfied:

| | |
|---|---|
| $4 < ft/fw$ | Conditional formula (1), |
| $1.72 < n\_PR$ | Conditional formula (2), |
| $35 < v\_PR$ | Conditional formula (3), | where

| | |
|---|---|
| ft | denotes a focal length of the entire system at a telephoto end, |
| fw | denotes a focal length of the entire system at a wide-angle end, |
| n\_PR | denotes a refractive index of the optical path changing element for a d-line, | and

| | |
|---|---|
| v\_PR | denotes an Abbe number of the optical path changing element for the d-line, | and wherein magnification variation is performed by movement of the lens unit at the first position and movement of the lens units located at a second and a third positions from the object side toward the image side.

* * * * *